US 12,105,893 B2

(12) United States Patent
Choi

(10) Patent No.: US 12,105,893 B2
(45) Date of Patent: Oct. 1, 2024

(54) RECONFIGURABLE KEYBOARD

(71) Applicant: ANWC Limited, Hong Kong (CN)

(72) Inventor: Nigel Choi, Hong Kong (CN)

(73) Assignee: ANWC Limited, Hong Kong (CN)

( * ) Notice: Subject to any disclaimer, the term of this patent is extended or adjusted under 35 U.S.C. 154(b) by 0 days.

(21) Appl. No.: 18/280,990

(22) PCT Filed: Jun. 8, 2022

(86) PCT No.: PCT/IB2022/055330
§ 371 (c)(1),
(2) Date: Sep. 8, 2023

(87) PCT Pub. No.: WO2022/259174
PCT Pub. Date: Dec. 15, 2022

(65) Prior Publication Data
US 2024/0168569 A1    May 23, 2024

(30) Foreign Application Priority Data

Jun. 8, 2021 (HK) .......................... 32021032741.9

(51) Int. Cl.
*G06F 3/02* (2006.01)
*G06F 3/023* (2006.01)

(52) U.S. Cl.
CPC .......... *G06F 3/0219* (2013.01); *G06F 3/0213* (2013.01); *G06F 3/0238* (2013.01)

(58) Field of Classification Search
CPC ..... G06F 3/0202; G06F 3/0219; G06F 3/0213
See application file for complete search history.

(56) References Cited

U.S. PATENT DOCUMENTS

2004/0155868 A1   8/2004   Hui et al.
2007/0065215 A1   3/2007   Brown et al.
(Continued)

FOREIGN PATENT DOCUMENTS

CN   106249907 A   12/2016
EP     2339425 A1    6/2011

OTHER PUBLICATIONS

International Search Report and Written Opinion dated Oct. 21, 2022, issued by the National Intellectual Property Administration, PRC, in connection with PCT/IB2022/055330, filed Jun. 8, 2022.

*Primary Examiner* — Van N Chow
(74) *Attorney, Agent, or Firm* — Downs Rachlin Martin PLLC

(57) ABSTRACT

A reconfigurable keyboard comprising a base and one or more keyboard keys attachable to the base for user interaction with the re-configurable keyboard. The base defines a surface comprising a plurality of attachment points and a plurality of electrical connection points. A key-board key comprises one or more formations each shaped and configured to interface with a corresponding attachment point so as to retain a component relative to the base. A keyboard key also has an electrical connector shaped and configured to interface with an electrical connection point of the base to enable an electrical connection to be formed between the keyboard key and the base upon attachment of the keyboard key to the base. The attachment points and electrical connection points of the base are relatively arranged to permit a keyboard key to be releasably attached to the base in multiple different positions and in different orientations.

10 Claims, 18 Drawing Sheets

(56) References Cited

U.S. PATENT DOCUMENTS

2010/0265182 A1* 10/2010 Ball .................. G06F 3/038
                                                              715/765
2010/0265183 A1* 10/2010 Mail ............... G06F 3/04895
                                                              345/173

* cited by examiner

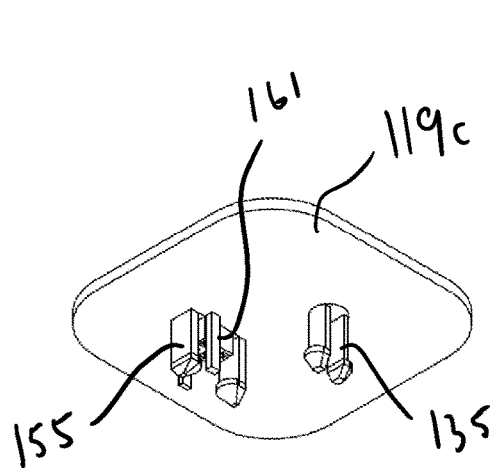
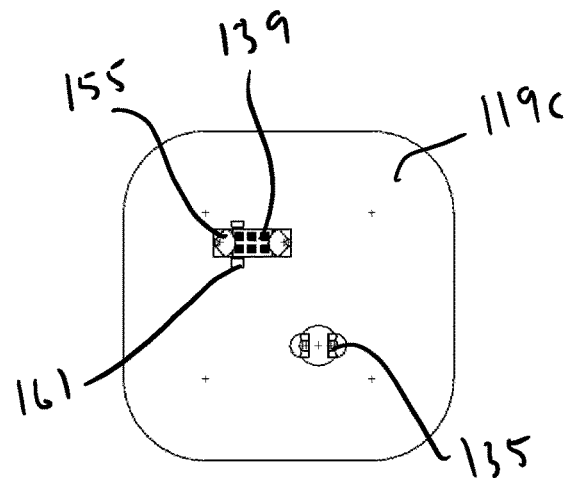
Fig. 9  Fig. 10
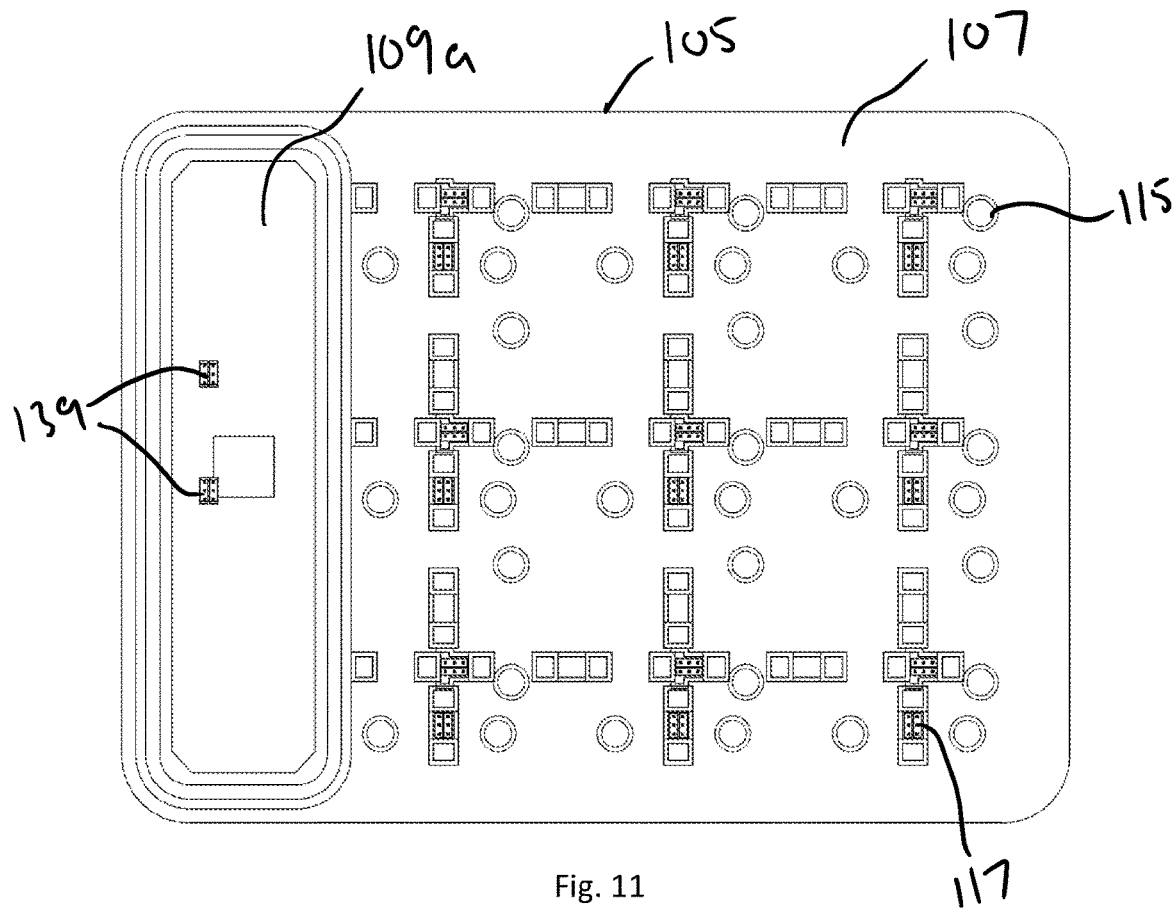
Fig. 11

RECONFIGURABLE KEYBOARD

TECHNICAL FIELD

The present invention relates to a reconfigurable keyboard.

BACKGROUND OF THE INVENTION

Electronic devices that facilitate user interaction take many forms. Peripheral devices are one category of such electronic devices that allow users to interact with and control a computing device to which the peripheral device is connected. For example, where the electronic device is a keyboard connected to a computing device, the keyboard may be used to instruct the computing device to type characters on a word processing software running on the computing device or it may be used to transmit other commands to the computing device with instructions to perform a particular computing operation. A computer mouse or trackpad is another type of electronic device that allows a user to interact with a computing device and control the position of a cursor displayed on the computing device display and to trigger computing operations by the computing device upon clicking one or more buttons incorporated in the mouse or trackpad.

Another example of an electronic device for user interaction is the computing device itself which may incorporate input/output components for human to computer communication. For example, a smartphone or tablet computer may comprise a touchscreen display and/or one or more buttons for user interaction and may even feature microphones and speakers for voice control.

Since electronic devices for user interaction are relatively complicated both in terms of the component parts and their assembly, end users generally purchase readymade electronic devices that have been manufactured according to a specific template. Whilst ready assembled devices have the advantage that consumers may operate an electronic device straight out of the box with minimal setup or technical knowhow, it has the disadvantage that end users are unable to configure hardware elements of an electronic device to their specific requirements or style.

Accordingly, kits for the construction of bespoke electronic devices such as peripheral devices are increasingly popular, particularly with relatively technically capable individuals such as hobbyists and computer enthusiasts. A keyboard, for example, is one type of peripheral device that may be constructed from component parts by technically capable end users. This is particularly the case in respect of mechanical keyboards which comprise multiple keys that implement a mechanical switch for increased durability and key responsiveness.

Another type of key based peripheral device is a macro pad which is similar to a standard keyboard in that it comprises multiple keys, but it differs in that it does not have a standard key layout and is more configurable to a particular user's requirements. A macro pad typically has fewer keys than a standard keyboard and is frequently used as a companion device to work alongside a standard keyboard and provide additional bespoke key operations that are not available on the standard keyboard. Such macro pads may additionally include interactive components other than keys such as sliders and knobs for even greater configurability and bespoke usability.

A problem with kits for constructing interactive electronic devices such as key boards and macro pads is that they are relatively complicated to assemble and require knowledge of electronics and specialist equipment such as soldering irons. Similarly, the construction of other types of interactive computing devices that may comprise microcomputers, such as the Raspberry Pi®, is generally restricted to more technically capable individuals with knowledge of electronics.

It is an object of the present invention to provide an improved electronic device for user interaction, such as a keyboard, that may be more easily assembled by a wider audience of end users and more easily reconfigured to the end user's requirements.

SUMMARY OF THE INVENTION

According to a first aspect of the present invention, there is provided a reconfigurable keyboard comprising a base and one or more keyboard keys attachable to the base, wherein the base comprises a printed circuit board (PCB) and defines a surface with a plurality of attachment points and a plurality of electrical connection points to the PCB, the plurality of attachment points and the plurality of electrical connection points relatively arranged to provide multiple attachment positions on the base for one or more keyboard keys, wherein each keyboard key comprises a PCB and a switch electrically connected to the keyboard key PCB and configured, in use, to generate an electrical signal upon actuation of the keyboard key to trigger the switch, each keyboard key further comprising one or more formations and an electrical connector extending from the keyboard key PCB, the one or more formations each shaped and configured to engage with a corresponding attachment point of the base to retain the keyboard key to the base, the electrical connector configured, upon attachment of the keyboard key to the base, to engage with an electrical connection point of the base to form an electrical connection between the keyboard key PCB and the base PCB, wherein the one or more formations of each keyboard key and corresponding attachment points of the base, and the electrical connector of the key board key and corresponding electrical connection points of the base, are configured for disengagement of the keyboard key from the base upon the application of an external force so that the position of attachment of the key board key to the base can be changed and the keyboard can be reconfigured, wherein one or more keyboard keys is selectable from a group of key board keys of different sizes, the relative arrangement between the electrical connector and one or more formations of one key board key size differing from the relative arrangement between the electrical connector and one or more formations of another keyboard key size, wherein, for each keyboard key size, the relative arrangement between an electrical connector and one or more formations of the keyboard key corresponds to the relative arrangement between an electrical connection point and one or more attachment points of the base so that each size of keyboard key is attachable to the base, and wherein one or more electrical connection points and one or more attachment points are relatively arranged for the attachment of one or more keyboard keys to the base in a first orientation and one or more electrical connection points and one or more attachment points are relatively arranged for the attachment of one or more keyboard keys to the base in a second orientation substantially perpendicular to the first orientation.

Advantageously, a keyboard according to the present invention may be easily assembled by attaching different keyboard key sizes to the keyboard base as desired and, if necessary, reconfigured by changing the position and orientation of the keyboard keys according to user requirements. Accordingly, a keyboard according to the present invention is highly configurable and more accessible to less technically capable users of keyboards and macro pads.

One or more attachment points and one or more electrical connection points may be grouped to form a key board key attachment zone for the attachment of a keyboard key to the base. The reconfigurable keyboard may comprise multiple keyboard key attachment zones. The multiple key board key attachment zones may be relatively arranged for the attachment of a keyboard key to the base via at least two of the multiple keyboard key attachment zones.

There are at least three keyboard key attachment zones relatively arranged for the attachment of a keyboard key to the base via two of the at least three attachment zones in a first orientation and to the base via another two of the at least three attachment zones in a second orientation which is different from the first orientation.

Each of the one or more electrical connection points and each of the one or more electrical connectors may be correspondingly shaped such that an electrical connector of a keyboard key may only interface with an electrical connection point of the base when the keyboard key is in a specific orientation relative to the base.

One or more electrical connection points may have a first shape and one or more electrical connection points may have a second shape which is different from the first shape, and wherein one or more electrical connectors of a first keyboard key size may be shaped and configured to only fit the first shape of electrical connection points.

The base PCB may be programmed to transmit a keyboard command to a connected computing device in response to actuation of an attached keyboard key, each electrical connection point for a keyboard key may be associated with a specific keyboard command, and the base PCB may be programmable to change the keyboard command associated with a particular electrical connection point.

According to a second aspect of the present invention, there is provided a method of assembling a reconfigurable keyboard according to the first aspect comprising the steps of providing a base and one or more keyboard keys and attaching one or more of the keyboard keys to the base each via an electrical connection point and one or more attachment points of the base.

The method may further comprise the steps of detaching one or more keyboard keys from the base and reattaching one or more keyboard keys to the base in a different configuration.

According to a third aspect of the present invention, there is provided a reconfigurable electronic device comprising a base and one or more components attachable to the base for user interaction with the reconfigurable electronic device, wherein the base defines a surface comprising a plurality of attachment zones for attachment of at least one component to the base, wherein an attachment zone comprises one or more attachment points and one or more electrical connection points, wherein a component comprises one or more formations each shaped and configured to interface with a corresponding attachment point of an attachment zone so as to retain a component relative to the base, and an electrical connector shaped and configured to interface with an electrical connection point of an attachment zone to enable an electrical connection to be formed between the component and the base upon attachment of the component to at least one attachment zone of the base, wherein the attachment zones of the base are configured to permit a component to be releasably attached to the base in multiple different positions, and wherein one or more attachment points and one or more electrical connection points of at least one attachment zone are relatively arranged to permit attachment of a component to the base in different orientations.

At least two attachment zones may be relatively arranged such that a component is attachable to the base via at least two attachment zones. At least three attachment zones may be relatively arranged such that a component is attachable to the base via two of the at least three attachment zones in a first orientation, and such that the component is attachable to the base via two of the at least three attachment zones in a second orientation which is different from the first orientation, and wherein an electrical connection is formed between the component and the base in both the first and second orientations.

The base may further comprise a main PCB, and the main PCB may be arranged such that an electrical connection is formed between the main PCB and a component via an electrical connection point upon attachment of a component to one or more attachment zones of the base.

A component may comprise a dedicated PCB configured to generate computing instructions relating to interaction between a user and the component, and wherein the dedicated PCB is connectable to the main PCB via an electrical connector of the component and an electrical connection point of an attachment zone upon attachment of the component to the base so that computing instructions from the component may be communicated to the main circuit board for further processing.

The reconfigurable electronic device may comprise multiple different components attached to the base. A component may be an electronic component operable for human interaction with a computing device. A component may comprise a computing device.

According to a fourth aspect of the present invention, there is provided a method of assembling a reconfigurable electronic device according to the third aspect comprising the steps of providing a base and one or more components and releasably attaching one or more of the components to the base via one or more attachment zones such that each component is electrically connected to the base via an electrical connection point.

The method may further comprise the step of detaching one or more components from the base and reattaching one or more components to the base in a different configuration.

DESCRIPTION OF THE DRAWINGS

In order that the invention may be more clearly understood, embodiments thereof will now be described, by way of example, with reference to the accompanying drawings in which:

FIG. 9 shows a perspective underside view of a part of a third component of the embodiment shown in FIG. 3:

FIG. 10 shows a plan view of the part shown in FIG. 9;

FIG. 11 shows a plan view of the parts shown in FIG. 3 with a first component attached to the base and with electrical connection points depicted through the component:

DETAILED DESCRIPTION

Figure 1:
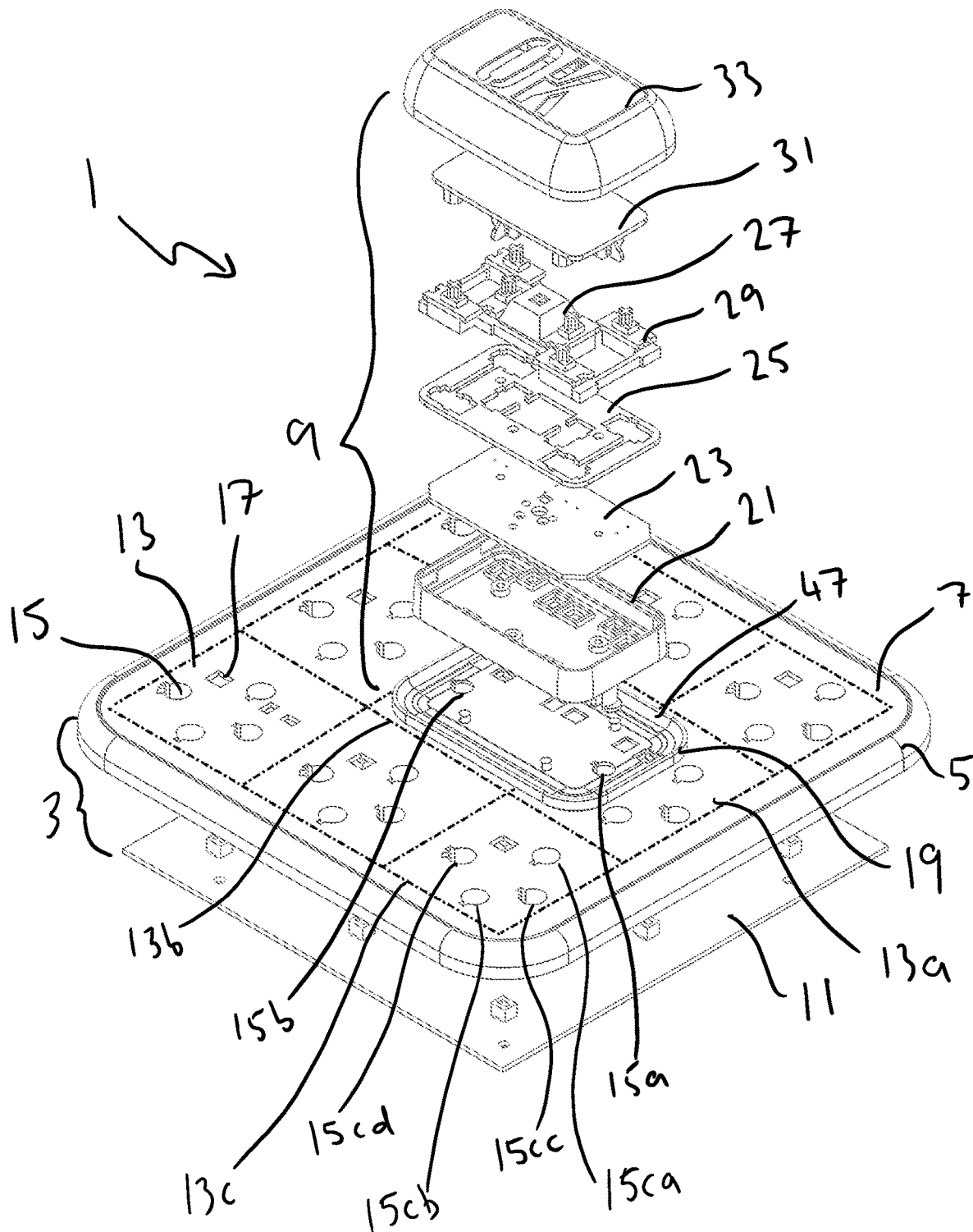
FIG. 1 shows an exploded perspective view of a first embodiment of the present invention.

Referring to FIG. 1, there is shown an exploded view of an electronic device configured as a peripheral device 1 for interfacing with a computing device (not shown) such as a personal computer, laptop or smartphone that is capable of storing and processing data. In the example embodiment depicted, the peripheral device 1, when in assembled form, constitutes a macro pad type of key board with one or more attached components 9 in the form of keyboard keys to enable key activated electronic signals to be sent to a connected computing device (not shown) to carry out an action such as implement a shortcut instruction, type a character on a word processing software, or move within a virtual gaming world.

The macro pad 1 comprises a base 3 with a plate 5 defining a substantially planar surface 7 for the attachment of one or more components 9) for user interaction, and a backing layer 11 that cooperates with the plate 5 to form a space for electronic components including a main printed circuit board (hereinafter "PCB") (not shown) and a USB controller (not shown) for interfacing with a connected computing device (not shown). The surface 7 of the plate 5 comprises a plurality of equally spaced apart attachment zones 13 for the attachment of one or more components 9 to the base 3. Each attachment zone 13 comprises four spaced apart keyhole shaped apertures 15 which provide attachment points for a component 9, and an electrical connection port 17 which provides an electrical connection point via which a component 9 may be electrically connected to the main PCB within the base 3.

The component 9 shown in the example embodiment is a mechanical keyboard key comprising multiple component parts that, when assembled, form a key block 9) that is attachable to the base 3 via one or more attachment zones 13. However, it will be appreciated that a component 9) may be any component electrically attachable to the base 3 that can generate and/or process electrical signals for human to computer communication. For example, a component 9 may comprise a knob dial, a rubber dome keyboard switch, a touch pad, a pressure sensitive pad, a slider, a miniaturised touchscreen, a speaker, a battery charger, or a computing device including a microcomputer.

The key block 9 depicted in the present embodiment comprises a key plate 19, a housing 21 for a PCB 23 dedicated to the operation of the key block component 9, a stabilising plate 25 for maintaining the key in a substantially horizontal orientation upon depression, a mechanical key switch 27 and switch frame 29, a key pad 31 for applying uniform pressure to the key switch 27, and a removable key cap 33 for protecting internal key block 9 components and for providing a decorative finish to the key block 9. The mechanical switch 27 comprises mutually engaging features (not shown) to provide an audible and tactile feedback for the user when a key block 9 is actuated.

Figure 2:
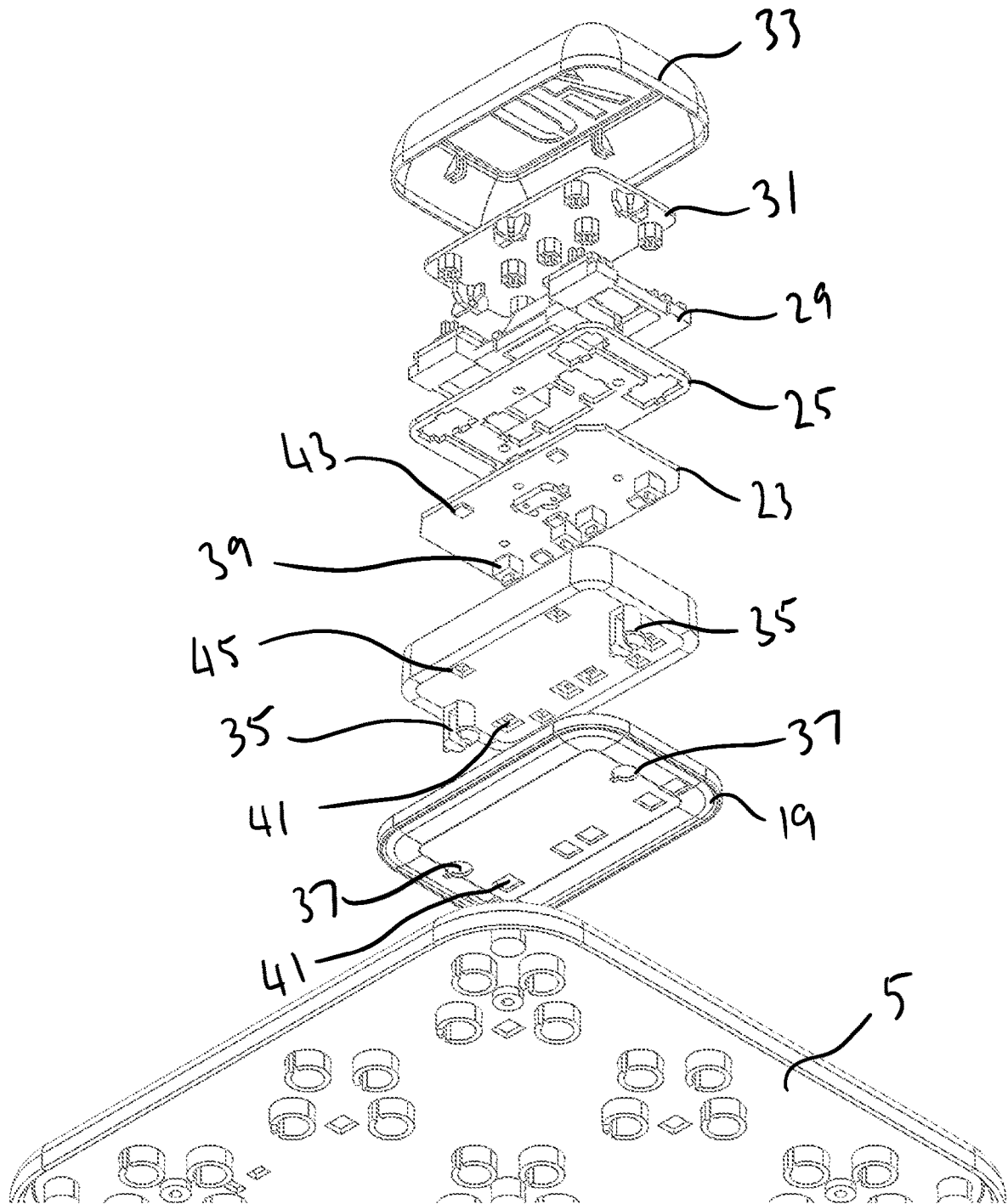
FIG. 2 shows an exploded perspective view of the underside of the embodiment shown in FIG. 1.

The key block 9 can have multiple different dimensions depending on the desired use case but in the embodiment depicted comprises a mid-sized key which is dimensioned to extend between two attachment zones 13. Referring to FIG. 2, the underside of the PCB housing 21 comprises two peg shaped formations 35 extending downwardly from the PCB housing 21 and which are each shaped and configured for insertion into a corresponding keyhole aperture 15 of an attachment zone 13 so that the key block 9 can be retained in place relative to the plate 5 with a snap-fit attachment. The key plate 19 includes corresponding apertures 37 to allow the two attachment pegs 35 to extend from the underside of the key block 9 and into corresponding apertures 15 of the base 3 when appropriately aligned.

As shown in FIG. 1, the spacing between the two attachment pegs 35 is chosen to correspond to the spacing between a keyhole aperture 15a of one attachment zone 13a and a keyhole aperture 15b of another attachment zone 13b. In the present embodiment, the spacing between the two attachment pegs 35 is chosen to permit attachment of the key block 9 to two adjacent attachment zones 13a, 13b although, for longer keys, the spacing could be chosen to permit attachment of a key block 9 across multiple attachment zones 13 from one side of the base 3 to the other. Likewise, for shorter keys intended for attachment to a single attachment zone 13, the spacing between two attachment pegs 35 may be chosen for attachment to corresponding apertures 15 of a single attachment zone 13.

Two keyhole apertures 15ca, 15cb of an attachment zone 13c are shaped to permit insertion of an attachment peg 35 in a first orientation and the two other keyhole apertures 15cc, 15cd of an attachment zone 13c are shaped to permit insertion of an attachment peg 35 in a second orientation which is substantially perpendicular to the first orientation. Accordingly, a key block 9 may be attached to the attachment zone of the base 3 such that the key is oriented in a first direction, or it can be attached to the same attachment zone 13 and oriented to extend in the second direction perpendicular to the first. In addition, one keyhole aperture 15cd is shaped to permit insertion of an attachment peg 35 in a third orientation different from the first or second. In this embodiment, the third orientation falls in between the first and second orientations such that a key block 9 can be attached to the base and arranged to extend substantially diagonally across the plate 5 between different attachment zones 13.

Referring again to FIG. 2, a plurality of electrical connectors 39 each comprising conducting elements extend from the underside of the key block PCB 23 are arranged to extend through correspondingly positioned apertures 41 formed in the PCB housing 21 and key plate 19, respectively. The shape and position of each electrical connector 39 is chosen relative to the attachment pegs 35 such that when a component 9 is attached to the base 3, an electrical connector 39 is positioned to interface with an electrical connection port 17 of an attachment zone 13. Accordingly, for each possible attachment position of a component 9 to one or more attachment zones 13, an electrical connector 39 of the component 9 will interface with an electrical connection port 17 of the base 3 so as to electrically connect the key block PCB 23 of the component 9 to the main PCB incorporated into the base 3 of the peripheral device 1.

The underside of the key block PCB 23 further comprises a plurality of LEDs 43 which are positioned to substantially align with corresponding LED apertures 45 formed in the PCB housing 21 so as to direct light downwardly through the LED apertures 45 toward the key plate 19. The key plate 19 material is chosen to diffuse the light from the LEDs 43, and the upturned lip 47 of the key plate 19 perimeter is chosen to direct the light outwardly from the underside of the key block 9 for decoration and illumination of the base 3 and key block 9. The key block PCB 23 is programmed to instruct the LEDs 43 to illuminate with a particular colour depending on the operational status of the key block 9. For example, where the key block 9 is associated with a function that may be "on" or "off", such as the mute status of a software application running on a connected computing device, the key block PCB 23 may be programmed to instruct the LED 43 to illuminate with the colour green when the mute function is on, and to illuminate with the colour red when the mute function is off so as to provide a clear visual indication to a user of the current operational status of the mute function of the software application. Similarly, where the function of a particular key block 9 is concerned with triggering the end of a software application process such as, for example, the termination of a voice or video call, the PCB 23 may be programmed to instruct the LEDs 43 to illuminate with a rotating pattern, pulsing or gradual fade in a specific colour such as yellow to visually indicate the termination of the call. It will be appreciated that the key block PCB 23 may be programmed to instruct the LEDs to illuminate in multiple different colours and patterns as desired so as to visually convey to the user multiple different operational states of a software application running on a connected computing device.

The stabilising plate 25 comprises a cut-out section with a shape that corresponds to protruding parts extending from the underside of the mechanical key switch 27 and frame 29. The cut-out allows the mechanical key switch 27 to extend through the stabilising plate 25 and connect to the key block PCB 23 for signal processing and also allows for one or more stabilising blocks to rest against the upper surface of the key block PCB 23 to help maintain the connection between the mechanical key switch 27 and the PCB 23 and also to help maintain internal components of the key block 9 in a substantially horizontal plane during actuation.

The key pad 31 is attached to the upper surface of the key switch frame 29 via a plurality of fixtures that are spaced apart and arranged to maintain the key pad 31 in a substantially horizontal plane when a key block 9 is actuated. The key pad 31 provides a substantially flat surface for supporting the key cap 33 and ensuring an even distribution of pressure on the mechanical key switch 27 regardless of which part of the upper surface of the key cap 33 is depressed to actuate the key block 9. When the key block 9 is securely and releasably attached to the base 3 via one or more attachment zones 13 such that an electrical connection is formed between the key block PCB 23 of the key block 9 and the main PCB of the base 3, actuation of the key block 9 by depressing the key cap 33 actuates the key switch 27. Actuation of the key switch 27 causes an electrical signal to be generated by the key block PCB 23 and transmitted from the key block 9 to the main PCB within the base 3 via the electrical connection between the key block 9 and the base 3. Each electrical signal received from a key block 9 is then processed by the main PCB and a stored command associated with the actuated key block 9 is then generated and transmitted to a connected computing device to implement the command.

A macro pad 1 may be assembled by selecting one or more key blocks 9 from a group of key blocks 9 with a choice of different sizes and attached to the base 3 via one or more attachment zones 13. For example, three key blocks 9 may be selected and attached to the base 3 by aligning the pegs 35 of each key block 9 with correspondingly positioned attachment points 15 of the base 3 and inserting the pegs 35 until each key block 9 is securely attached to the base 3 with a snap-fit and retained in place. The electrical connection ports 17 are arranged relative to the attachment points 15 such that an electrical connector 39 is aligned with and inserted into a corresponding electrical connection port 17 upon attachment of a key block 9 to the base 3. Where it is desired to change the configuration of the macro pad 1, one or more key blocks 9 may be removed from the base by releasing the pegs 35 from the attachment points 15 and repositioned in an alternative set of attachment points 15 and with a new electrical connection by an associated electrical connection port 17. This repositioning procedure may include changing the orientation of a key block 9 from a horizontal position to a vertical position (depending on the desired working orientation of the macro pad 1). Accordingly, multiple different configurations of the macro pad 1 are possible depending on the choice of key blocks 9 and their attachment positions on the base 3.

Figure 3:
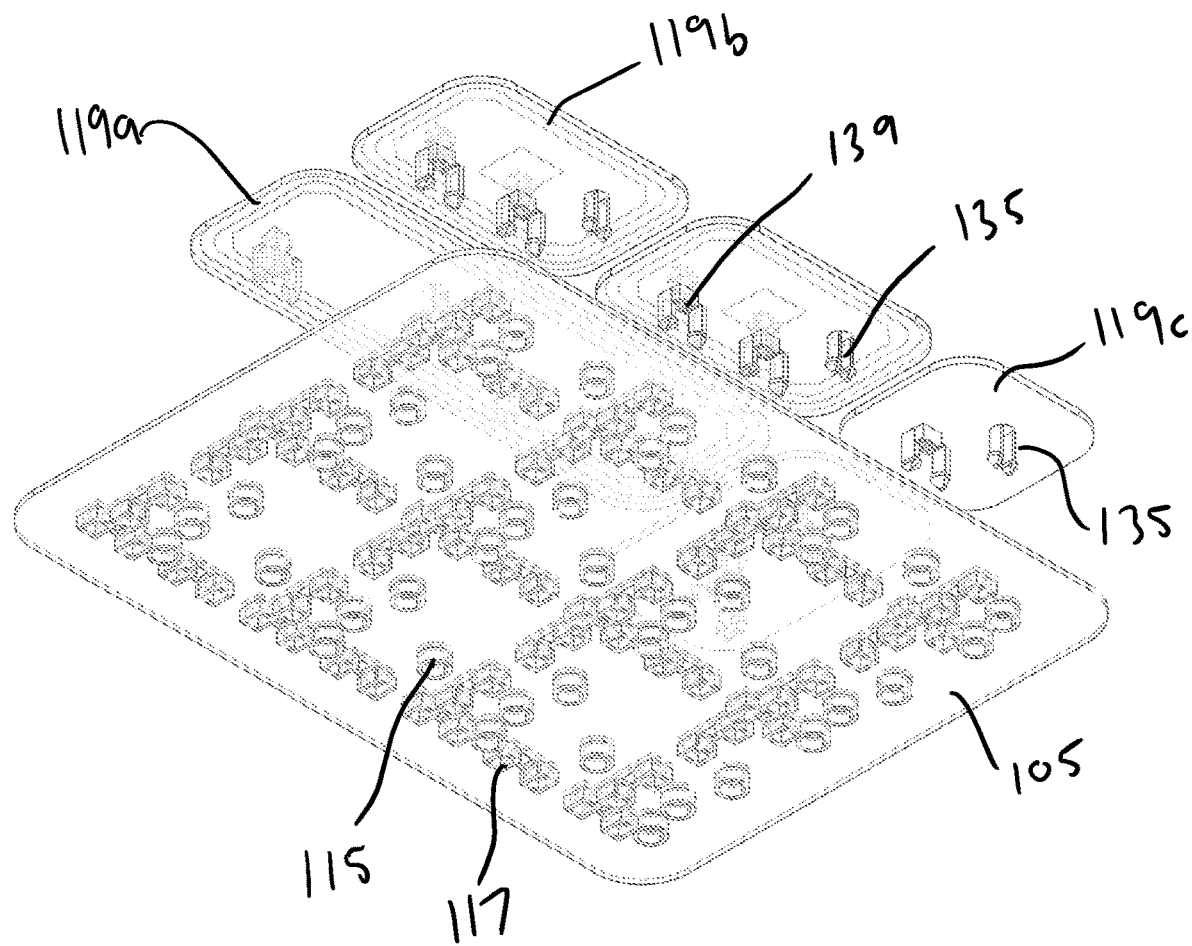
FIG. 3 shows an exploded underside view of parts of a second embodiment of the present invention.
Figure 4:
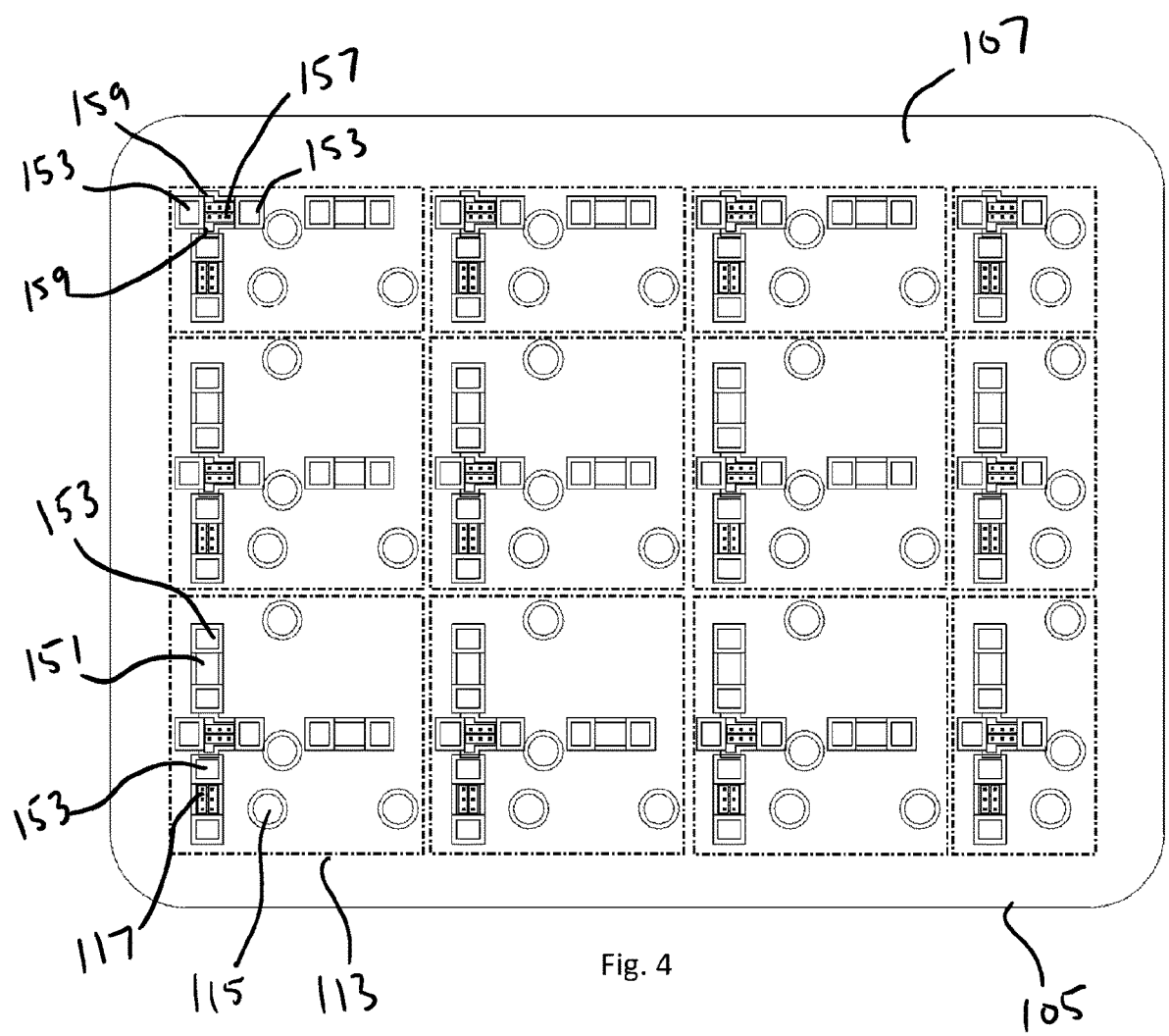
FIG. 4 shows a plan view of a base part of the embodiment shown in FIG. 3.
Figure 5:
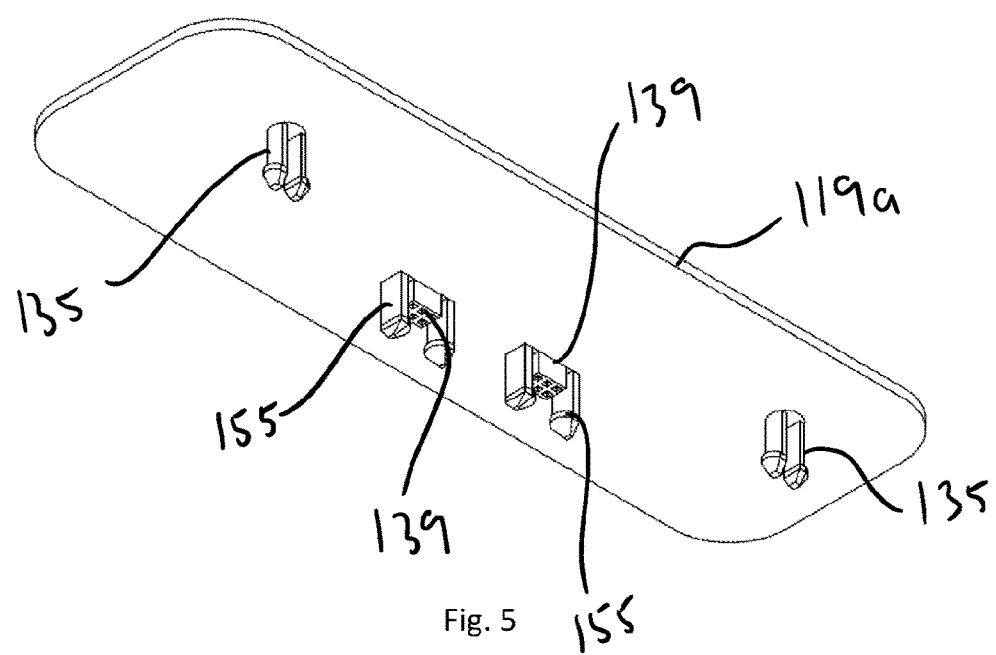
FIG. 5 shows a perspective underside view of a part of a first component of the embodiment shown in FIG. 3.
Figure 6:
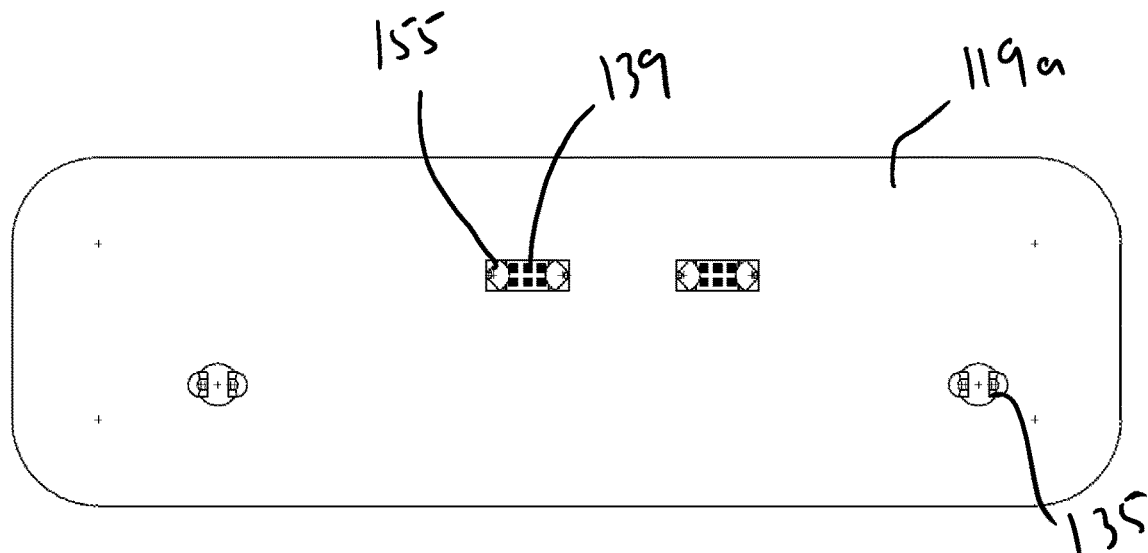
FIG. 6 shows a plan view of the part shown in FIG. 5.
Figure 7:
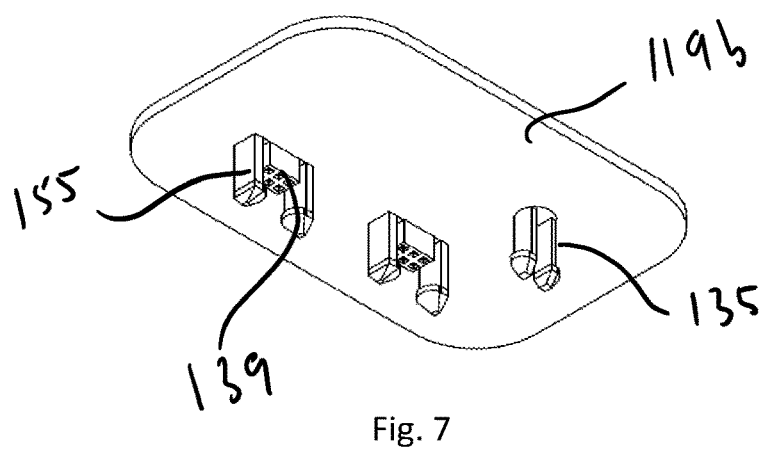
FIG. 7 shows a perspective underside view of a part of a second component of the embodiment shown in FIG. 3.
Figure 8:
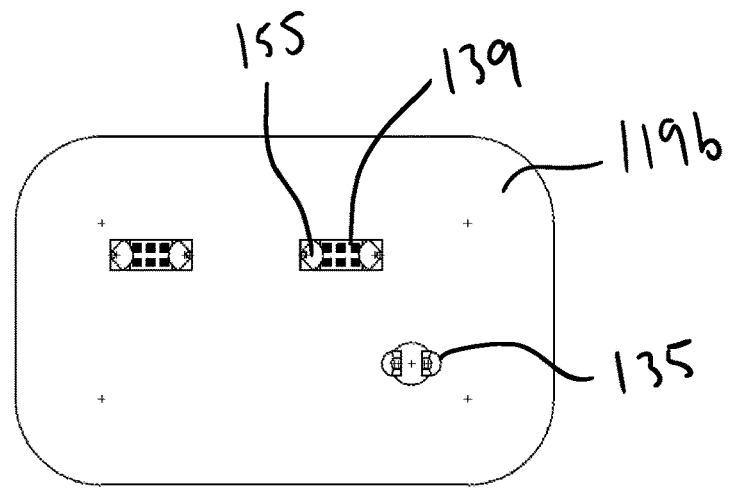
FIG. 8 shows a plan view of the part shown in FIG. 7.

Referring to FIGS. 3 and 4, in an alternative embodiment, the plate 105 comprises a plurality of attachment zones 113. As in the first embodiment, each attachment zone 113 comprises a plurality of spaced apart apertures 115 that provide attachment points for male peg shaped connectors 135 extending from the underside of a key plate 119 of a component 109. Each attachment zone 113 also comprises a pair of electrical connector points 117 in the form of 6-pin PCB male header connectors which are arranged relative to the connection apertures 115 to interface with corresponding 6-pin PCB female header sockets 139 extending from the underside of the key plate 119 of a component. A component may be a key block having similar constituent pieces as a key block 9 of the above-described embodiment including a PCB with LEDS for controlling operation of the key block, a key switch to trigger a signal from the PCB, and a protective key cap with decorative finish to convey the key function. Whilst in the present embodiment the male header connectors 117 are arranged on the plate 105 and the female header sockets 139 are arranged on the components 109, it is envisaged that the male and female connectors could be reversed such that the female header sockets are arranged on the plate 105 and the male header connectors are arranged on the components.

With reference to FIGS. 5 to 10, three different key plates 119a, 119b, 119c are depicted which each form the base of a different sized key block 109. A first 'large' key plate 119a is dimensioned to extend across three attachment zones 113 of the plate 105, a second 'medium' key plate 119b is dimensioned to extend across two attachment zones 113, and a third "small" key plate 119c is dimensioned to be connected to the plate 105 via a single attachment zone 113. The large and medium key plates 119a, 119b each comprise two peg connectors 135 and two female header sockets 139. The position and spacing of the peg connectors 135 and female header sockets 139 are chosen such that when connected to the plate 105, one of the female header sockets 139 interfaces with a male header connector 117 of an attachment zone 113 and one female header socket 139 extends into an empty aperture 151 formed in the plate 105. With this arrangement of male header connectors 117 and empty apertures 151, an electrical connection can be formed between one of the two female header sockets 139 and a male header connector 117 regardless of the attachment position of the key plate 119a, 119b to the plate 105.

Figure 12:
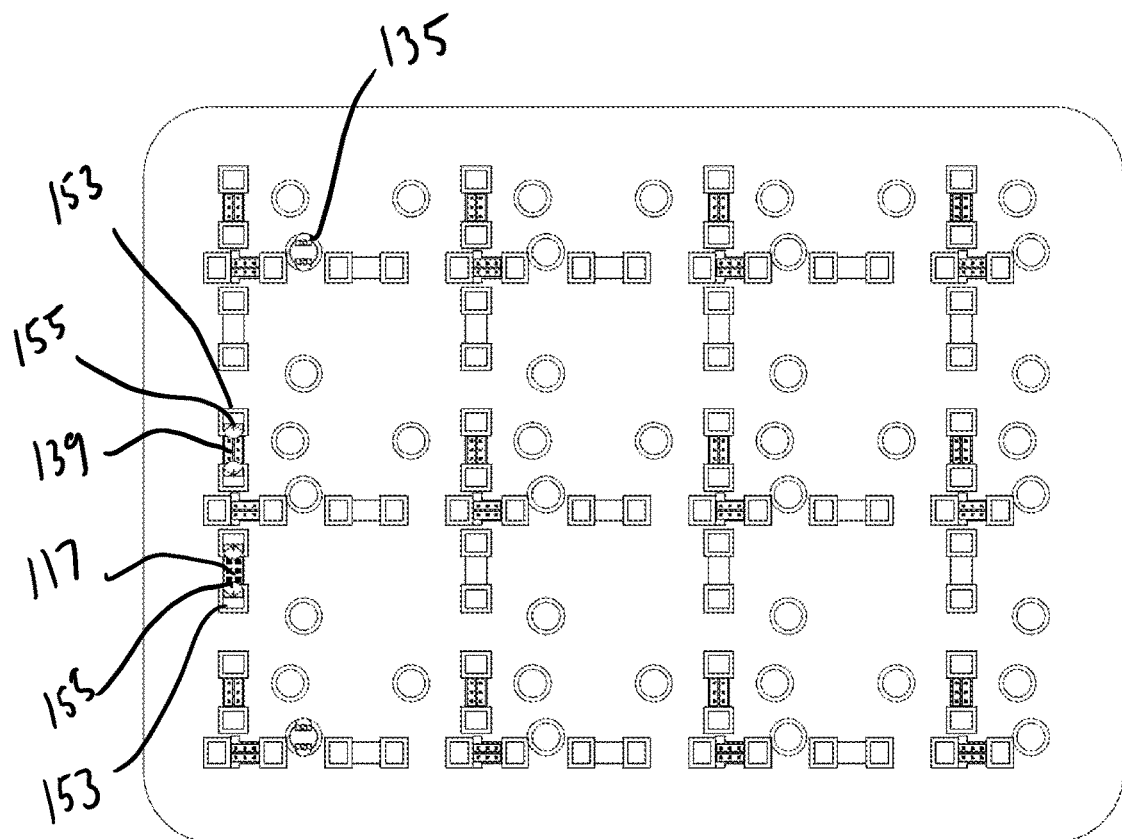
FIG. 12 shows an underside view of the embodiment shown in FIG. 11.
Figure 13:
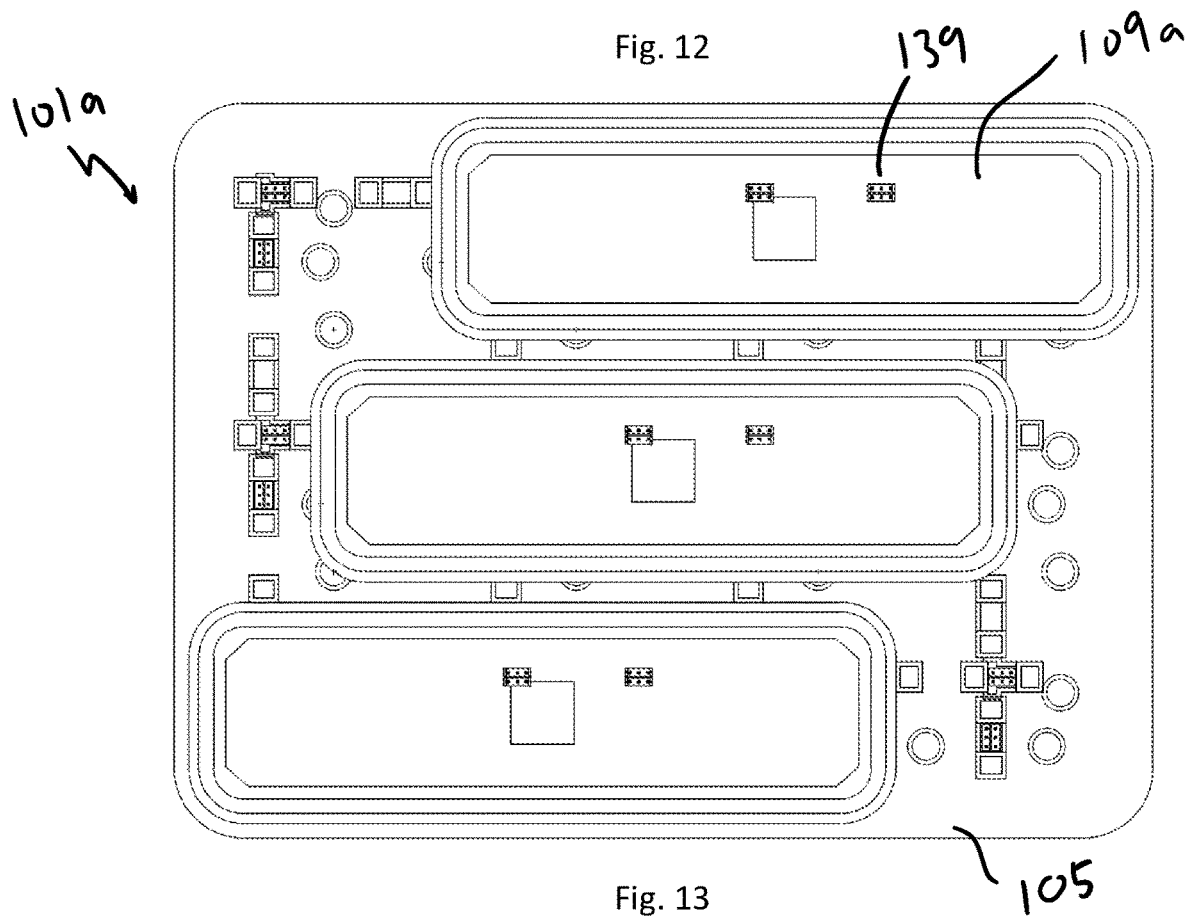
FIG. 13 shows a plan view of the embodiment shown in FIG. 11 with an additional two first components attached to the base and with electrical connection points depicted through the components.
Figure 14:
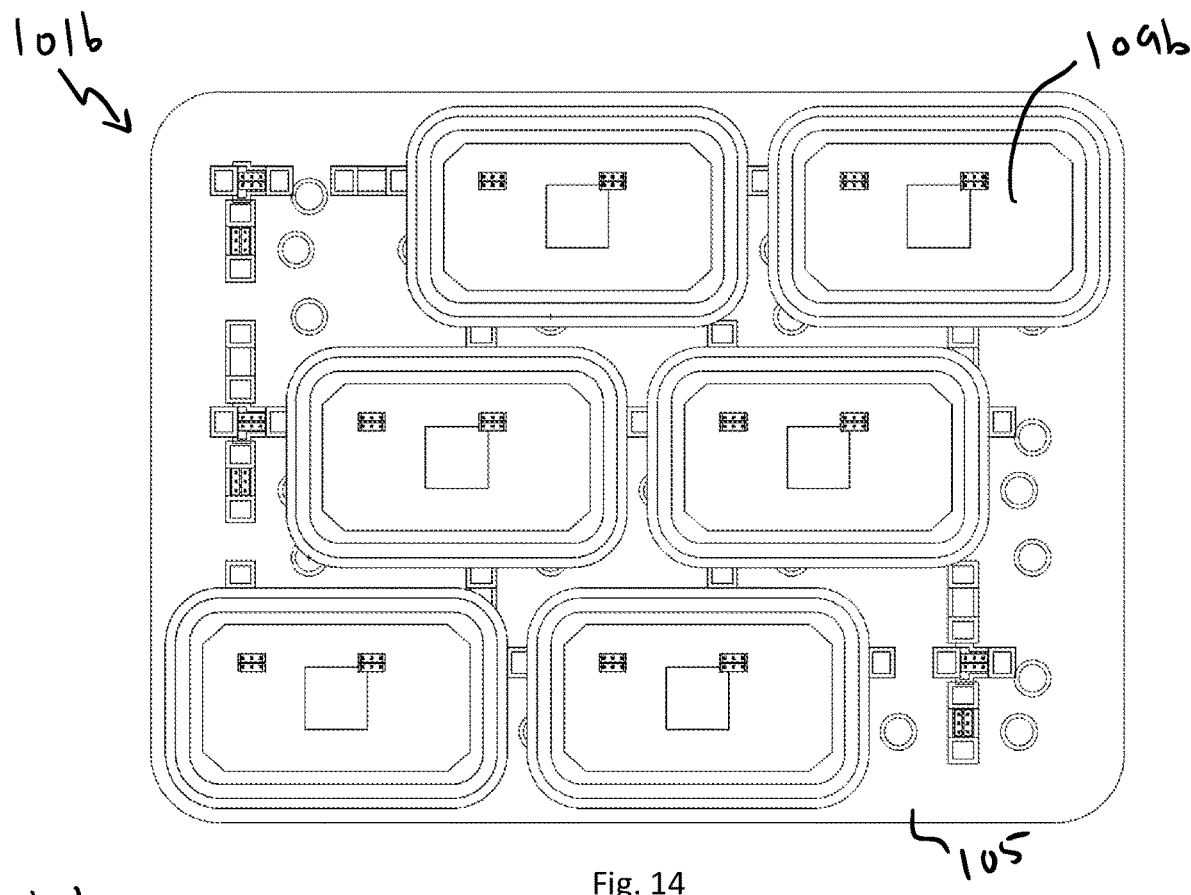
FIG. 14 shows a plan view of the parts shown in FIG. 3 with a second type of component attached to the base in a first configuration and with electrical connection points depicted through the components.
Figure 15:
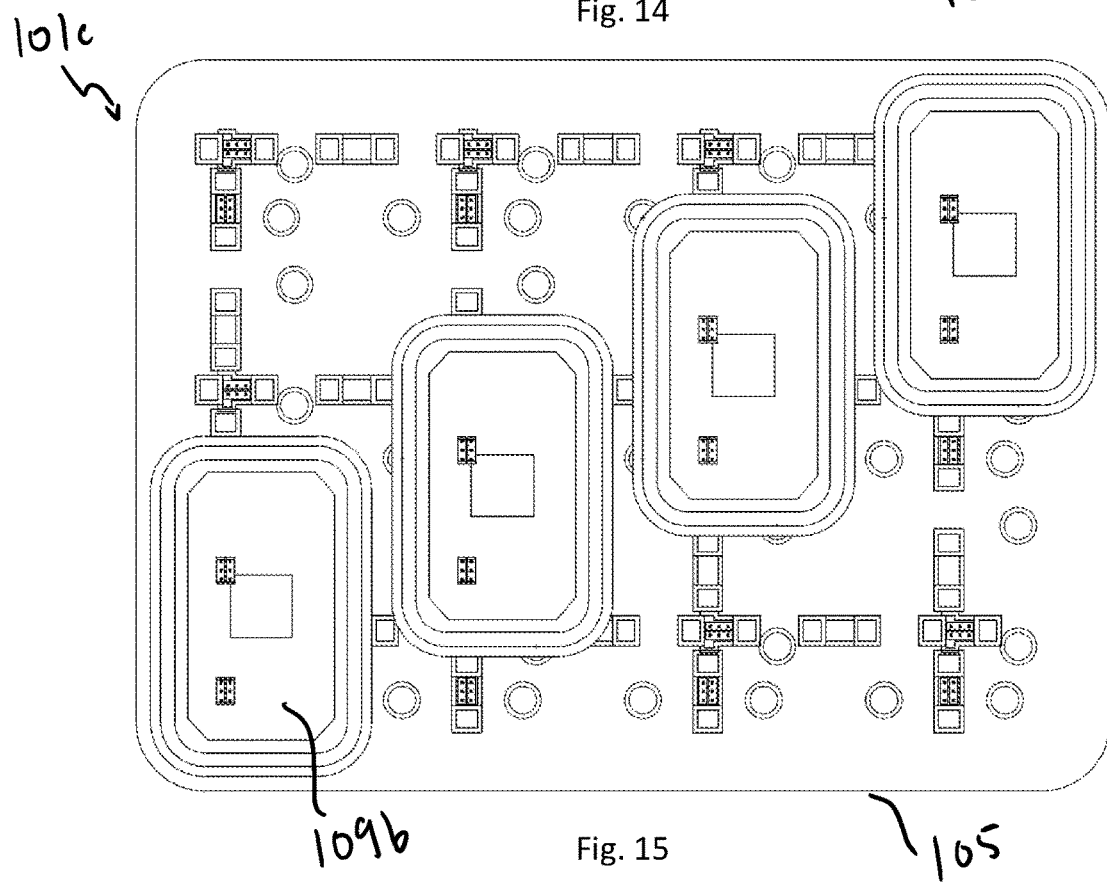
FIG. 15 shows a plan view of the embodiment shown in FIG. 14 with the second type of components attached to the base in a second configuration and with electrical connection points depicted through the components.
Figure 16:
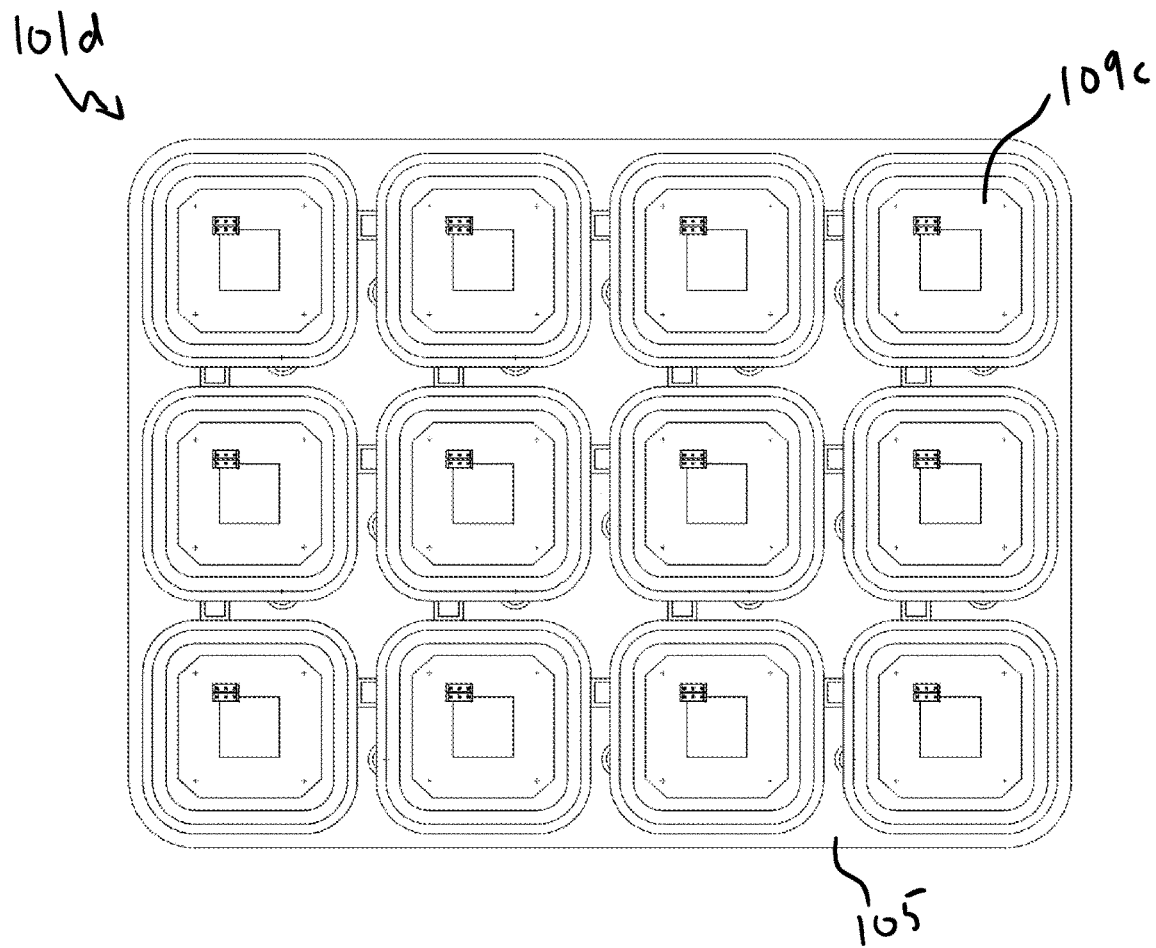
FIG. 16 shows a plan view of the parts shown in FIG. 3 with a third type of components attached to the base and with electrical connection points depicted through the components.

Both the male header connectors 117 and the empty apertures 151 of the base 103 are flanked by a pair of side apertures 153 which are shaped and configured to receive a pair of correspondingly shaped and positioned extension members 155 arranged on either side of each female header socket 139. The extension members 155 are shaped to form a snap-fit attachment with the side apertures 153 upon insertion of an extension member 155 into a side aperture 153. The snap-fit connection formed between the extension members 155 and side apertures 153 ensures that the electrical connection formed between a female header socket 139 and a male header connector 117 is securely maintained. Accordingly, as shown in FIGS. 11 and 12, both the extension members 155 and the peg connectors 135 ensure the key plate 119 and, hence, the component 109a is held firmly in place when connected to the base 103.

Referring to FIGS. 9 and 10, the key plate 119c of a small key block 109c comprises only one peg connector 135 and only one female header socket 139. To facilitate attachment of a small key block 109c, each attachment zone 113 comprises a male header connector 157 which is flanked by a pair of side apertures 153 and a pair of square shaped guide apertures 159. The guide apertures 159 are shaped to receive a pair of guide members 161 which are correspondingly shaped and configured to be inserted into the guide apertures 159 upon attachment of a single zone key block 109c to an attachment zone 113. The mutually cooperating guide apertures 159 and guide members 161 ensure a small key block 109c can only be attached to an attachment zone 113 in the orientation necessary to form an electrical connection between the main PCB and the dedicated PCB of the key block 109c.

As shown in FIGS. 13 to 16, the arrangement of the attachment zones 113 and the relative arrangement of the interfacing attachment parts of both the base 103 and the components 109 allow for a wide range of different configurations of a peripheral device 101a, 101b, 101c, 101d with different key blocks 109a, 109b, 109c arrangeable in either a horizontal or vertical orientation, as desired.

Figure 17:
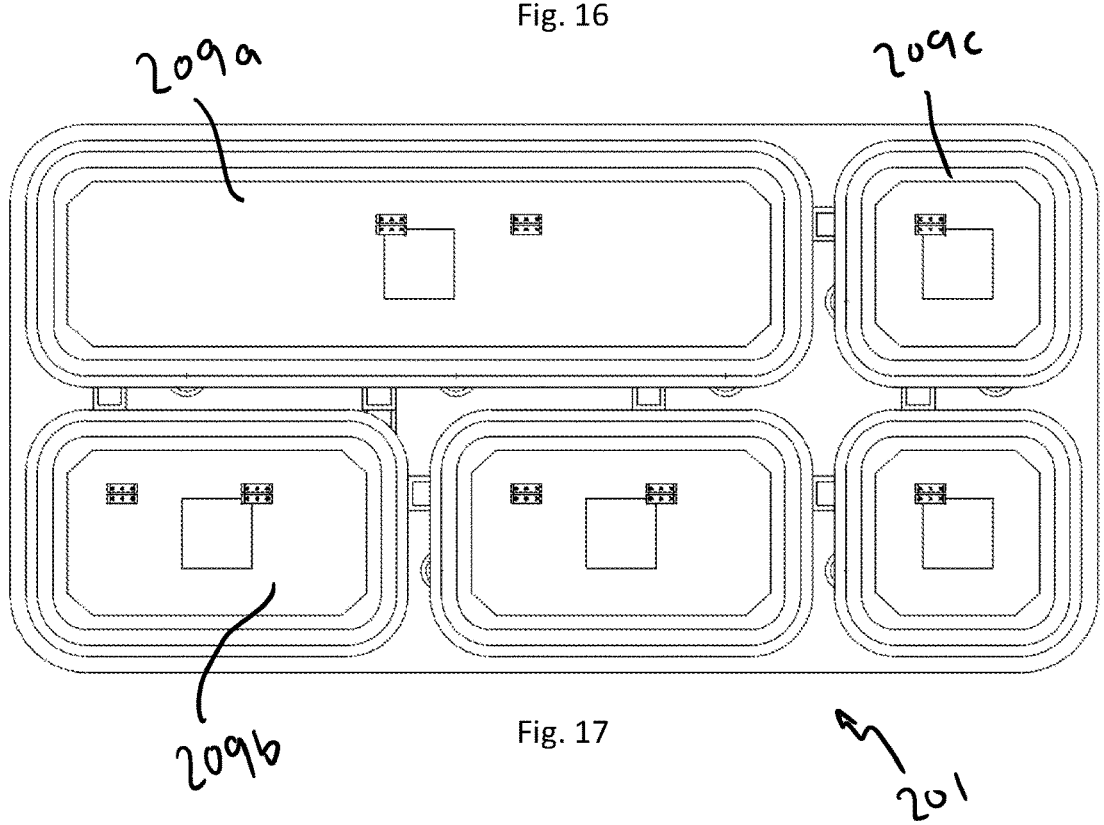
FIG. 17 shows a plan view of a third embodiment of an example of the present invention with first, second and third types of components attached.
Figure 18:
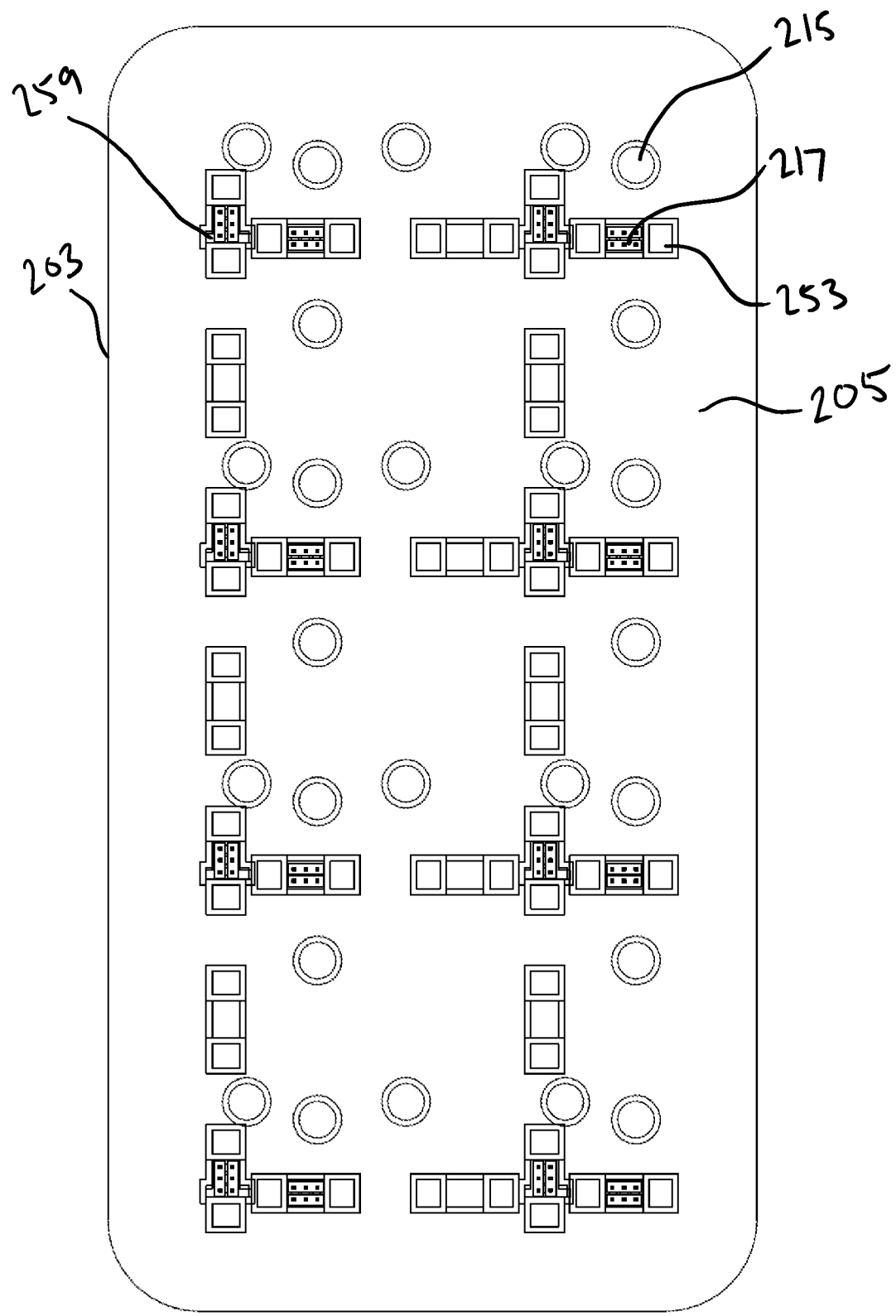
FIG. 18 shows a plan view of the base part of the embodiment shown in FIG. 17.
Figure 19:
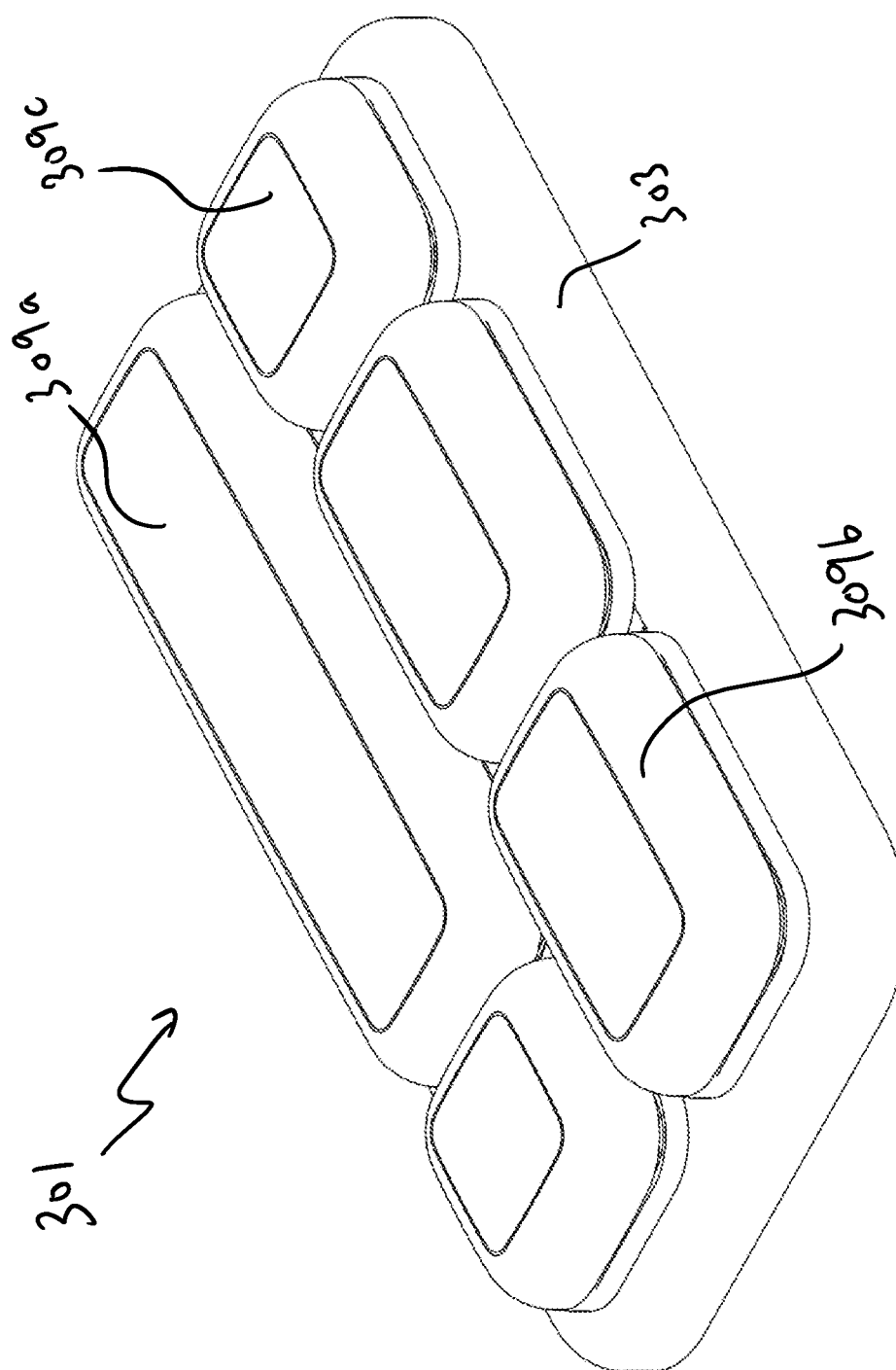
FIG. 19 shows an alternative embodiment of a macro pad according to the invention in assembled form.

Referring to FIGS. 17 and 18, in an alternative embodiment, the base 203 has a smaller footprint with only eight attachment zones 213. With this smaller footprint plate 205 it is possible to build a computer key based peripheral device 201 with a more limited number of key blocks 209a, 209b, 209c and a key configuration that is more suited to a particular activity such as controlling functions of a video conferencing software operating on a connected computing device.

A further alternative embodiment of an electronic device according to the present invention, or parts thereof, is shown in FIGS. 19 to 23. The embodiment depicted shows the electronic device 301 in a macro pad format with one 'large' key block 309a, two 'medium' key blocks 309b and two 'small' key blocks 309c releasably attached to the upper surface 307 of plate 305. The plate 305 comprises eight attachment zones 313 formed in the surface 307 which combine to form an 8×4 grid pattern of attachment points 315 for the attachment of one or more key blocks 309a, 309b, 309c.

Each attachment zone 313 comprises four equally spaced apart attachment points 315 in the form of rounded square shaped depressions formed in the upper surface 307 of the plate 305 and arranged at each corner of the respective attachment zones 313. Each key block 309a, 309b, 309c comprises four stud formations 335 arranged at each corner of the underside of a key plate 319 and positioned so as to be substantially aligned with a corresponding attachment point 315 of an attachment zone 313 upon attachment of the key plate 319 to the base 303. Accordingly, an attachment point 315 is shaped to receive a corresponding cylindrical stud formation 335 of a key block 309a, 309b, 309c. The stud formations 335 are dimensioned to be seated in corresponding attachment points 315 with a friction fit so that a component 309 can be attached to the base 303 and retained in place when in use but also so that an attached component 309 can be relatively easily removed from the base 303 with the application of sufficient force to overcome the friction fit and allow the component positions to be changed to reconfigure the keyboard 301 according to desired use requirements.

In the embodiment depicted, a small key block 309c may extend across a single attachment zone only (or a 2×2 grid of attachment points 315), a medium key block 309b may extend across one and a half attachment zones (or a 3×2 grid of attachment points 315), and a large key block 309a may extend across three attachment zones 313 (or a 6×2 grid of attachment points 315). It will be appreciated that other sized components may be selected so as to extend across different sized grids of attachment points 315 as desired. For example, one component may be sized and configured to extend across a 4×2 grid of attachment points (or two full attachment zones 313), and one component may even be sized and configured to extend across the entire 8×4 grid of the base 303 (or all eight attachment zones 313).

Each attachment zone 313 further comprises at least one electrical connection port 317 which is shaped to receive a corresponding electrical connector 339 extending from the underside of the key plate 319 of each key block 309. One type of electrical connection port 317a, 317b is shaped and configured to receive a correspondingly shaped electrical connector 339a extending from the underside of a large key block 309a or medium key block 309b. Some of this shape of electrical connection port 317a are arranged on the base 303 so as to be oriented in a first direction that is substantially parallel with a row of attachment points 315. Others of this shape of electrical connection port 317b are oriented in a second direction which is substantially perpendicular to the first direction and substantially parallel with a column of attachment points 315. Consequently, a medium key block 309b may be attached and electrically connected to the base 303 in two different orientations extending either horizontally or vertically (depending on the chosen orientation of the macro pad 301).

A second type of electrical connection port 317c of each attachment zone 313 is shaped and configured to receive both an electrical connector 339a of a large key block 309a or a medium key block 309b and an electrical connector 339b extending from the underside of a small key block 309c. The shape of the electrical connector 339b of a small key block 309c is chosen such that it will only fit the second type of connection port 317 and, hence, may only be connected to the base 303 via this second type of electrical connection port 317c. Furthermore, the electrical connection port 317c of an attachment zone 313 is positioned relative to the attachment points 315 of the attachment zone 313 such that a small key block 309c can only be attached to the attachment zone 313 in one orientation and position. This ensures that a user can only attach a small key block 309c to the base 303 in a predetermined position and orientation.

The electrical connection ports 317a, 317b, 317c and attachment points 315 of the base 303, and the studs 335 and electrical connectors 339a, 339b of the key blocks 309a, 309b, 309c are relatively arranged and positioned such that when a key block 309a, 309b, 309c is appropriately positioned or oriented relative to the base 303, the studs 335 and electrical connectors 339a, 339b of the key block 309a, 309b, 309c are aligned with a set of attachment points 315 and an electrical connection port 317a, 317b, 317c. Thus, the relative arrangement of the interfacing connectors ensures that a key block 309a, 309b, 309c is correctly secured to the base 303 and an electrical connection is formed between the key block 309a, 309b, 309c and the base 303.

As described, the key plate 319 forms the interfacing part of the key block 309a, 309b, 309c that facilitates releasable attachment of a key block 309a, 309b, 309c to the base 303. The key plate 319 further forms a seat for a PCB 323 contained within each key block 309a, 309b, 309c, and a lower housing for the key block 309a, 309b, 309c. As with the above-described embodiments, the underside of PCB 323 comprises a plurality of LEDs (not shown) configured to illuminate with a particular colour or in a particular pattern to indicate to a user the current operational state of the associated key function.

An aperture 341 is formed in the floor of the key plate 319 and through the electrical connector 339a, 339b to form a channel through which conducting elements of the electrical connectors 339a, 339b can extend from the PCB 323. Accordingly, when a key block is attached to the base 303, conducting elements of the key block PCB 323 are connected to the main PCB 363 of the base 303 so that electrical signals may be transmitted therebetween.

Figure 20:
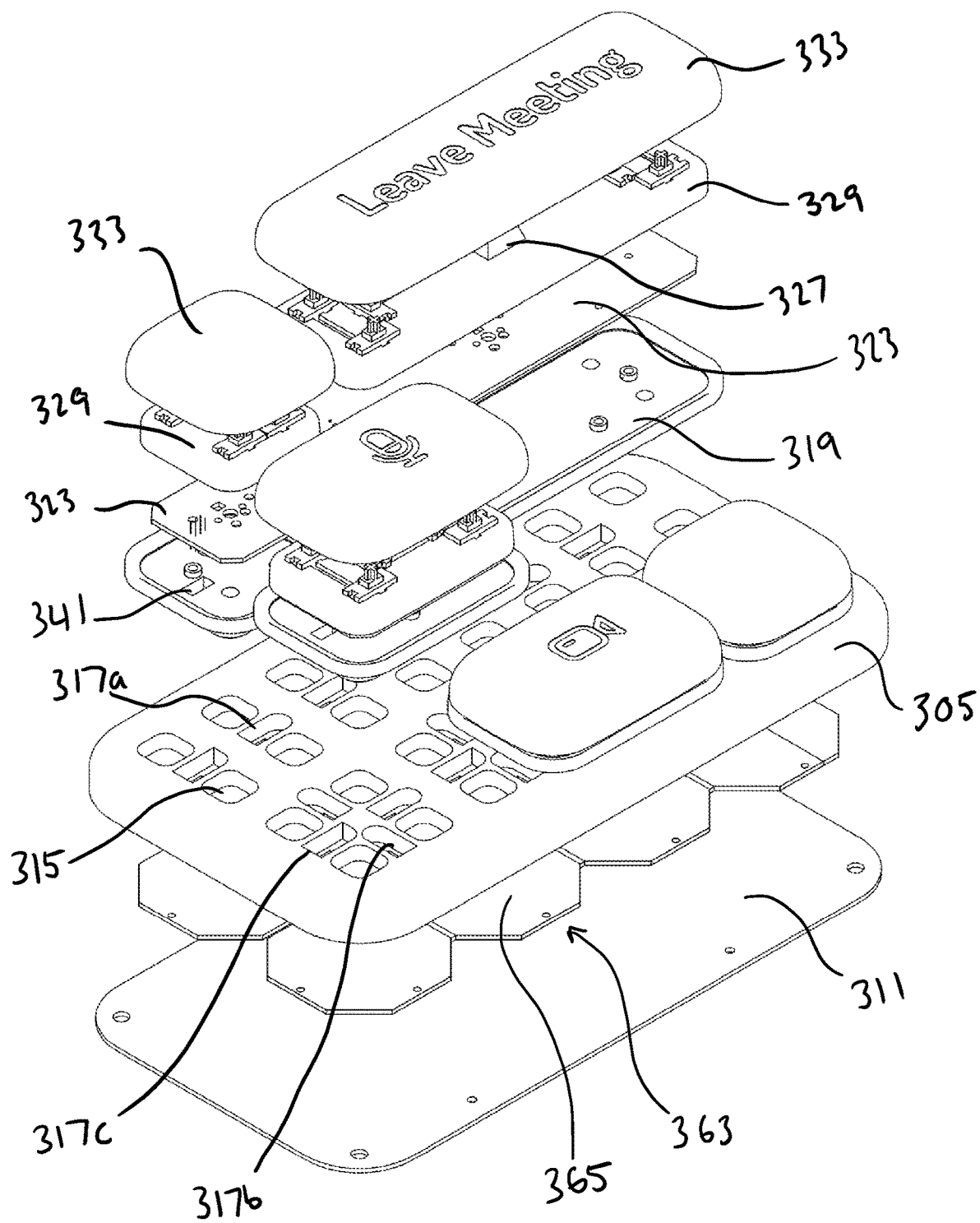
FIG. 20 shows an exploded top perspective view of the macro pad shown in FIG. 19.
Figure 21:
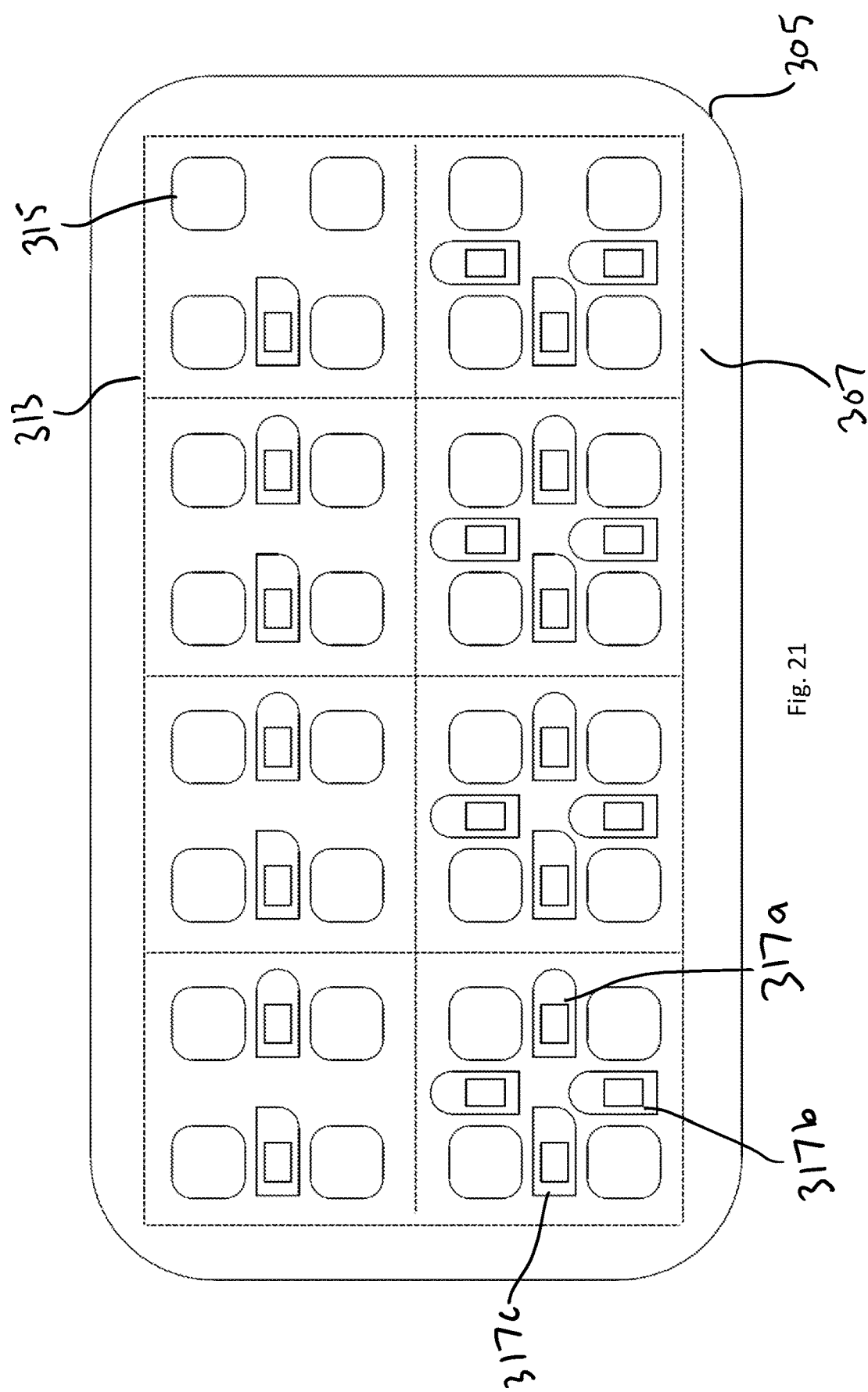
FIG. 21 shows a base part of the embodiment shown in FIG. 19.
Figure 22:
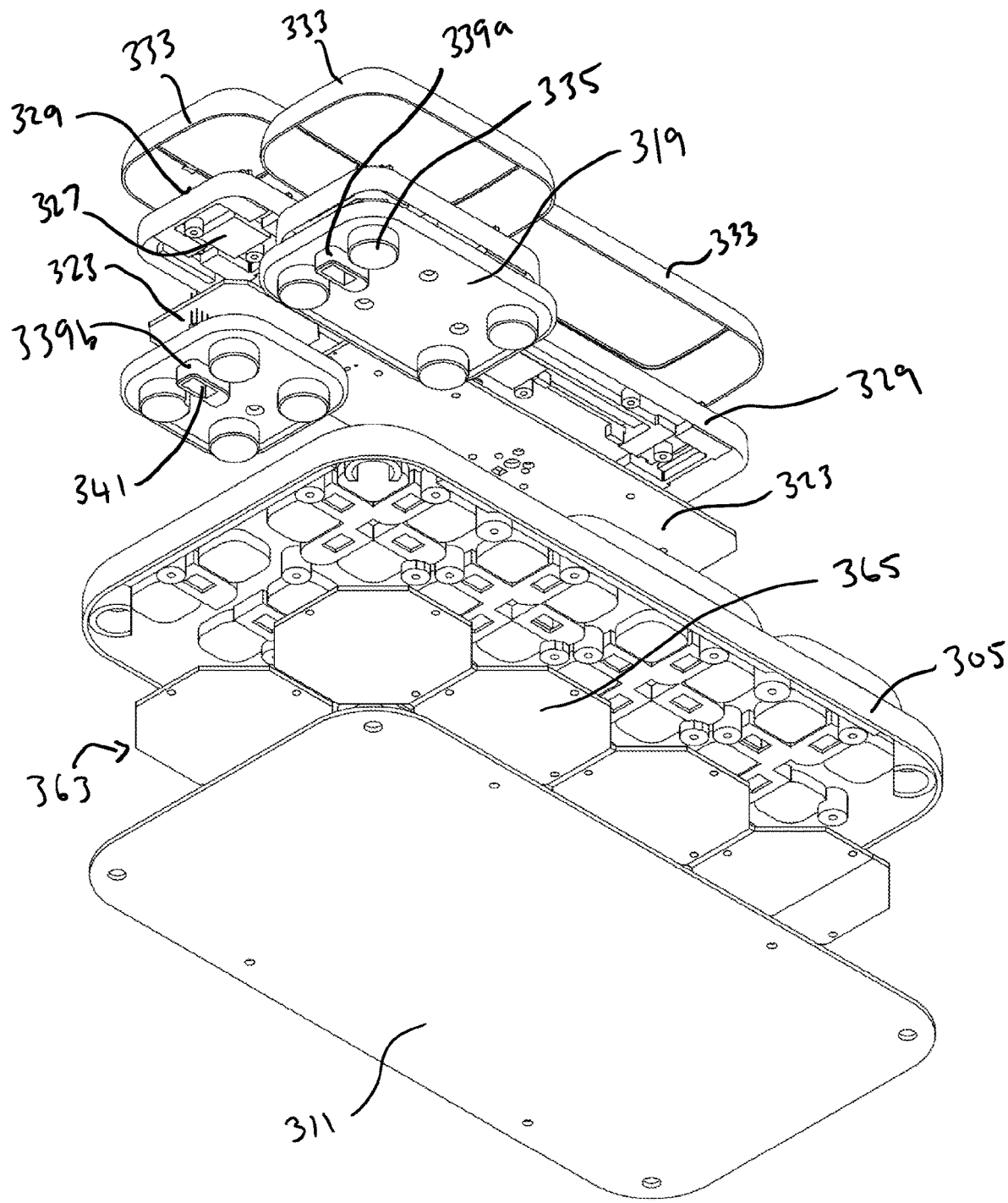
FIG. 22 shows an exploded underside view of the macro pad shown in FIG. 19.
Figure 23:
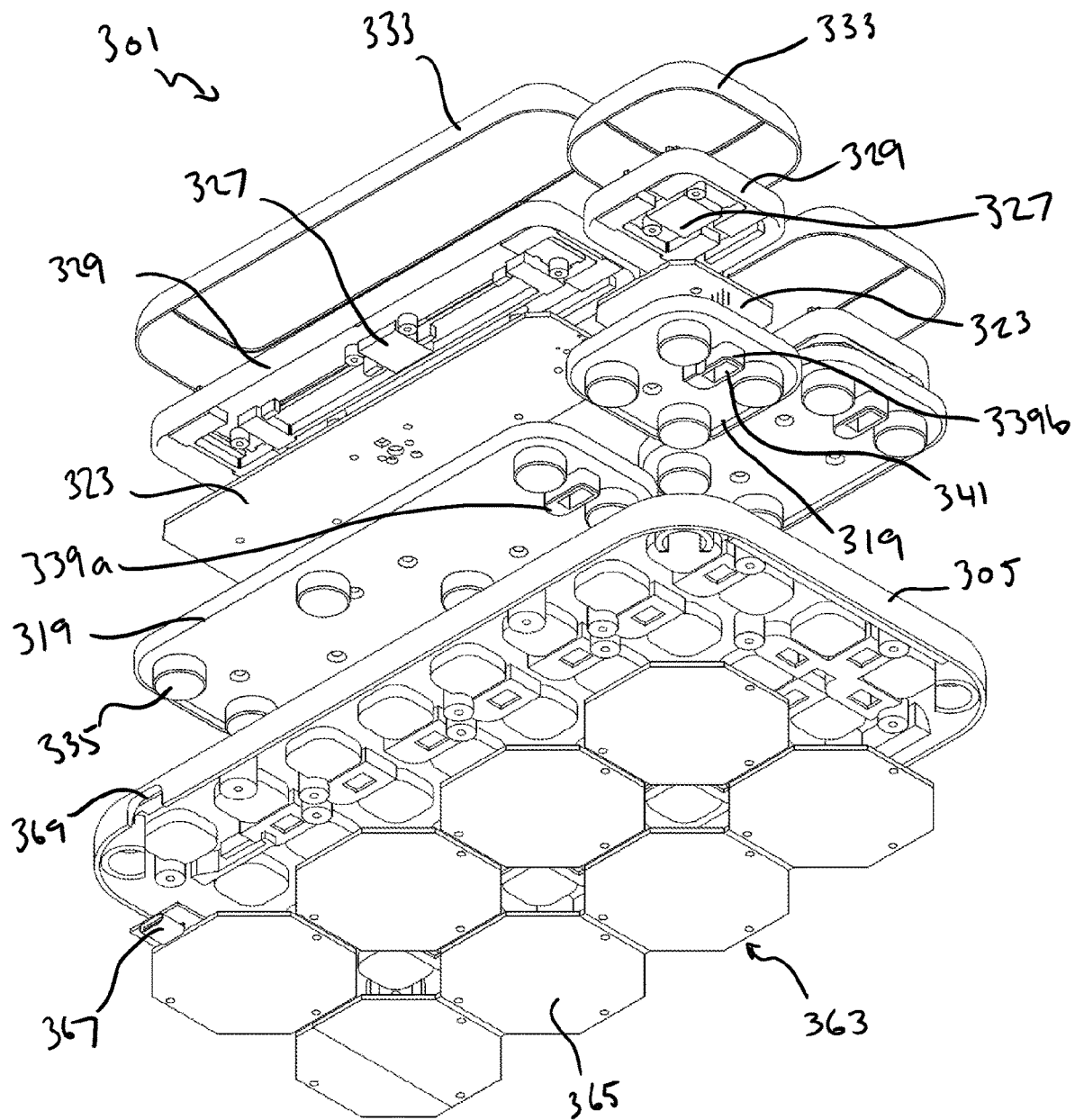
FIG. 23 shows an alternative exploded underside view of the macro pad shown in FIG. 19 without a backing layer of the base part.

Each key block 309a, 309b, 309c further comprises a mechanical key switch 327 which is electrically connected to PCB 323 and supported by a switch frame 329. The shape of the switch frame 329 is such that it substantially encapsulates PCB 323 when attached to the upper surface of the key plate 319. The switch frame 329 is also shaped to substantially conform to the inner surface of a key cap 333 which may be attached to the switch frame 329 so as to cover the mechanical key switch 327 and the supporting switch framework. The mechanical switch 327 is positioned at the centre of the switch frame 329 to ensure reliable actuation of the mechanical switch 327 regardless of where on the key cap 333 a user applies a force to actuate the key block 309a, 309b, 309c. As shown in FIG. 20, the upper surface of a key block 309a, 309b, 309c may comprise a decorative finish to indicate the key function such as "Leave Meeting" for leaving an online virtual meeting, a microphone icon for activating or deactivating the mute function of a computing device, or a video camera icon for activating or deactivating a computing device video camera.

When the fully assembled key blocks 309a, 309b, 309c are attached to the base 303, each key may be actuated to transmit a corresponding control signal to the main PCB 363 which is housed within the space defined by the plate 305 and a backing layer 311. In the present embodiment, the main PCB 363 is comprised of eight octagonally shaped modules 365 which are connected together to form a single PCB unit. The modules 365 are connected and arranged such that each module 365 is positioned below a corresponding attachment zone 313 of the base 303. Accordingly, each module 365 comprises a connector for interfacing with conducting elements of a key block connector 339 when inserted into an electrical connection port 317a, 317b, 317c so as to form an electrical connection between the main PCB 363 and the PCB 323 of an attached key block 309a, 309b, 309c. Constructing the main PCB 363 from multiple modules 365 has the advantage that the main PCB 363 can be expanded or reduced such that it can be configured to work with electronic devices with more or less attachment zones 313. The main PCB 363 is further connected to a USB controller 367 which is arranged to provide a USB connection port 369 to one side of the base 303 so that the macro pad 301 can be attached to a computing device with a wired connection for user interaction. Additionally, the PCB 363 may be connected to or incorporate a wireless Bluetooth® device for a wireless connection with a Bluetooth® capable computing device.

As with the above-described embodiments, multiple macro pad configurations are possible through selection and positioning of differently sized key blocks 309a, 309b, 309c on the base 303. If it is desired to reconfigure the macro pad 301, one or more key blocks 309a, 309b, 309c can be easily removed from the base 303 and repositioned according to user requirements.

Figure 24:
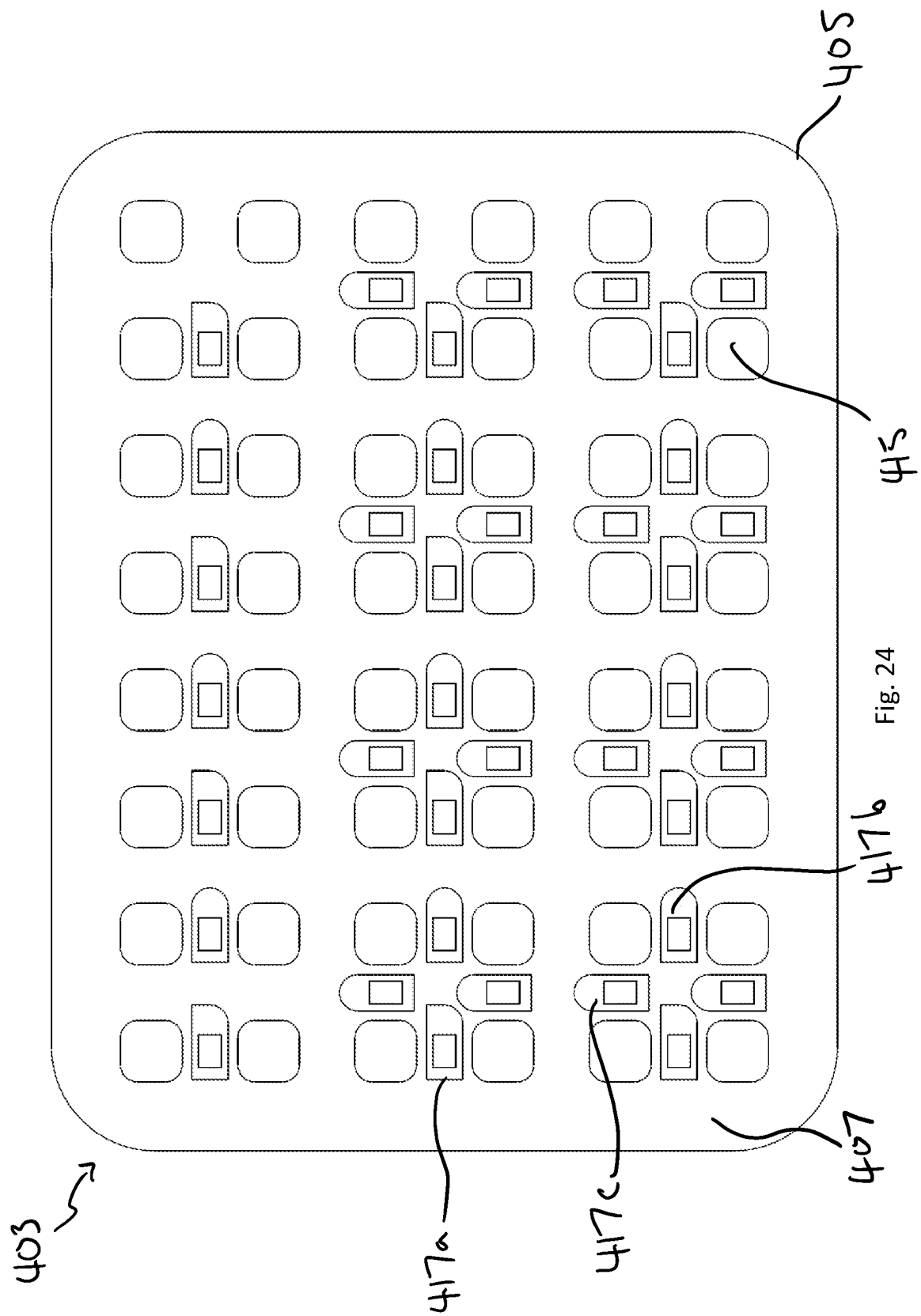
FIG. 24 shows a base part of a larger version of the macro pad shown in FIG. 19.
Figure 25:
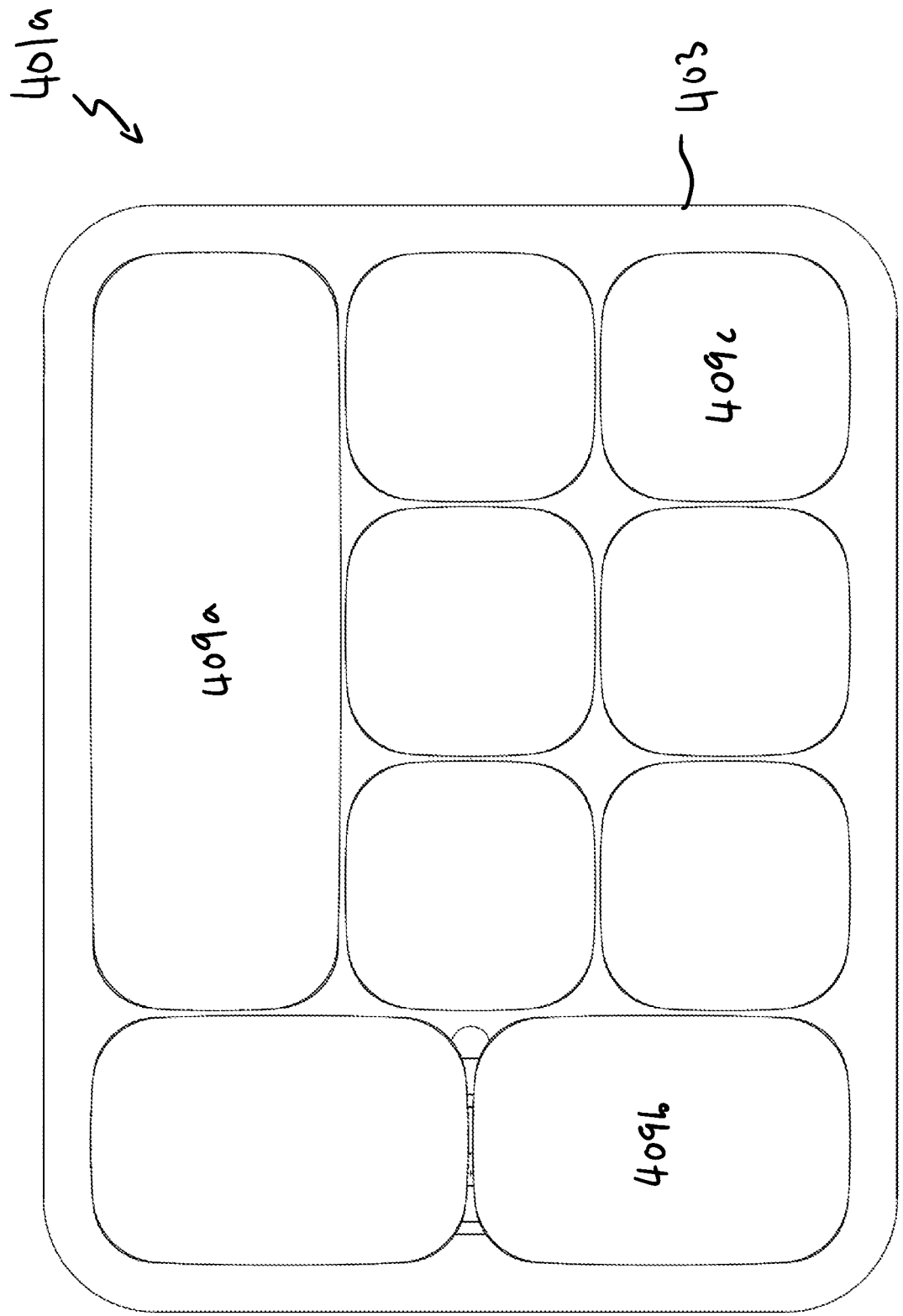
FIG. 25 shows one configuration of a macro pad assembled using the base part shown in FIG. 24.
Figure 26:
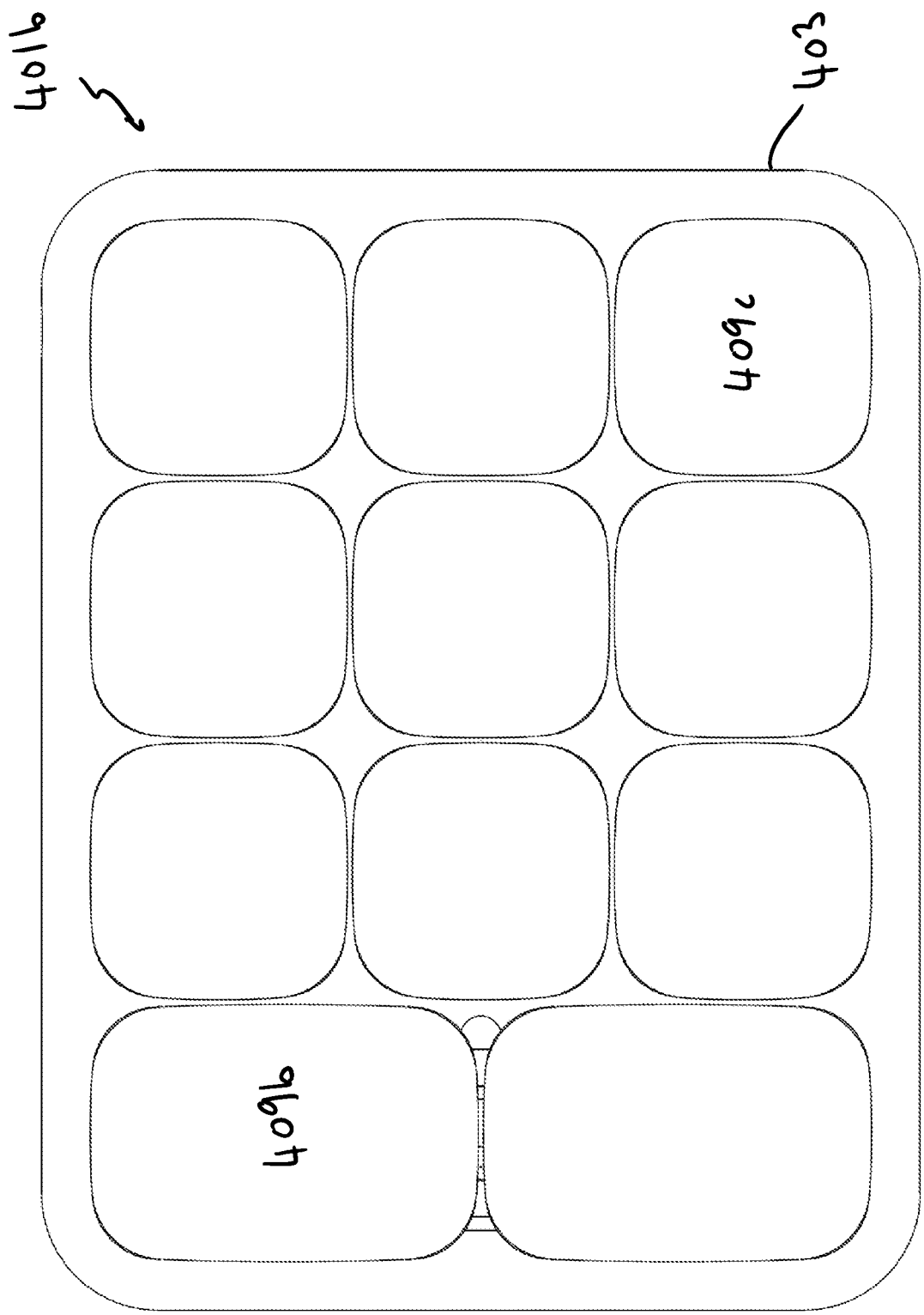
FIG. 26 shows an alternative configuration of a macro pad assembled using the base part shown in FIG. 24.

FIG. 24 shows a base 403 comprising a plate 405 with an upper surface 407 in which is formed a grid of 8×6 attachment points 415 and a plurality of electrical connection ports 417a, 417b, 417c arranged relative to the attachment points 415 to form twelve possible attachment zones. The above-described modular based main PCB may be adapted for use with the larger base 403 by connecting three additional modules so as to provide electrical connectivity for a component via each of the attachment zones. As will be appreciated a base 403 according to this embodiment allows for an even greater number of key combinations and configurations and this is highlighted in FIGS. 25 and 26 which show two different macro pad configurations 401a, 401b.

Furthermore, this larger base 403 allows for a large key block 409*a* to be arranged to extend horizontally or vertically across the base 403 (depending on chosen orientation of the macro pad). A macro pad 401*a*, 401*b* assembled using base 403 is considered particularly suited for gamers that require a greater number of keys and configurations than the embodiment of FIGS. 19 to 23.

For each of the above-described embodiments, the key block PCB 23, 323 may be configured to generate and transmit an electrical signal to the main PCB 363 when a key block 9, 109, 209, 309, 409 is actuated. In its simplest form, the key block PCB 23, 323 may generate an 'on' signal when the key switch 27, 327 is triggered, thereby indicating the corresponding key has been actuated. When the key block 9, 109, 209, 309, 409 is released such that the key switch 27, 327 is deactivated, the key block PCB 23, 323 ceases to transmit a corresponding signal to the main PCB 363. Accordingly, the main PCB 363 processes the 'on' signals and transmits corresponding commands to a connected computing device when a user actuates the keys of the macro pad 1, 101, 201, 301, 401.

To ensure the correct computing command is transmitted to the computing device, the main PCB of each embodiment comprises a memory and is programmable to associate a computing command with each electrical connection point and store the association in the memory. Therefore, when a key block 9, 109, 209, 309, 409 is attached to the base 3, 103, 203, 303, 403 via an electrical connection point 17, 117, 217, 317, 417 and the key block 9, 109, 209, 309, 409 is actuated to trigger the key switch and transmit an electrical signal to the main PCB, a computing command is generated by the main PCB which corresponds to the stored computing command associated with the electrical connection point 17, 117, 217, 317, 417 to which the key block 9, 109, 209, 309, 409 is attached. Since the key block attachment positions can be changed to reconfigure a macro pad 1, 101, 201, 301, 401, the main PCB is programmable to alter or 'remap' the computing commands associated with a particular electrical connection point.

Programming of the main PCB may be enabled by a software application operating on a computing device to which the macro pad is connected. The software application may be used to change the computing commands associated with each electrical connection point and store the new configuration in the memory of the main PCB. Accordingly, when the position of a key block on the base is changed such that the key block is electrically connected to the main PCB via a different electrical connection point, and it is desired to keep the same computing command for the repositioned key block, the software application may be used to switch the computing command from being associated with the old electrical connection point to the new electrical connection point. Consequently, the computing commands associated with each electrical connection point may be reconfigured to match the hardware configuration of the macro pad and the desired computing commands generated by each key block.

Alternatively, for an improved user experience, it is envisaged that each key block PCB may comprise a memory and computer logic to store and generate a desired computer command. As such, the computing command is associated with the key block rather than the electrical connection point of the main PCB so that the same computing command is generated by the key block and transmitted to the main PCB regardless of the key block attachment position.

Advantageously, each key block can then be repositioned on the base to reconfigure the macro pad without having to also reconfigure the computing commands associated with the electrical connection points. Where it is desired to change the computing command associated with a key block, the software application can be used to update the computing command stored in the memory of the key block so that the key block generates the new computing command signal regardless of the attachment position on the base. It will be apparent that using a PCB in the attachable component that has memory and computer logic is also useful for other components such as knobs, dials, and sliders that inherently generate more complex signals than simple key switches.

In addition to changing the functions associated with a particular key block, the software application may be configured to allow the LED function to be customised. For example, a user may reprogram the PCB of a key block with the software application to change the illumination colours of a particular key associated with a particular function or to change the LED illumination pattern e.g., from a pulsing to a fading or rotating pattern or simply to maintain a steady illumination. Accordingly, with the accompanying software application, the macro pad can be highly customised to a particular user's taste and style, and to provide immediate visual feedback regarding the operational state of a software application running on a computing device and controlled by the macro pad.

The above embodiments are described by way of example only. Many variations are possible without departing from the scope of the invention as defined in the appended claims.

For example, where at least one component of the electronic device 1, 101, 201, 301, 401 comprises a computing device such as a microcomputer, the electronic device 1 may be assembled into a portable computing device with multiple additional attached components to facilitate user interaction with the microcomputer. Such additional attached components may include trackpads, keyboard keys, dials, knobs switches, sliders, displays, and touchscreens to enable a computing device to be easily constructed with multiple different configurations and capabilities that are tailored to user requirements without the need for advanced knowledge of electronics and the associated assembly equipment.

The invention claimed is:

1. A reconfigurable keyboard comprising a base and one or more keyboard keys attachable to the base,
   wherein the base comprises a printed circuit board (PCB) and defines a surface with a plurality of attachment points and a plurality of electrical connection points to the PCB, the plurality of attachment points and the plurality of electrical connection points relatively arranged to provide multiple attachment positions on the base for one or more keyboard keys,
   wherein each keyboard key comprises a PCB and a switch electrically connected to the keyboard key PCB and configured, in use, to generate an electrical signal upon actuation of the keyboard key to trigger the switch,
   each keyboard key further comprising one or more formations and an electrical connector extending from the keyboard key PCB, the one or more formations each shaped and configured to engage with a corresponding attachment point of the base to retain the keyboard key to the base, the electrical connector configured, upon attachment of the keyboard key to the base, to engage with an electrical connection point of the base to form an electrical connection between the keyboard key PCB and the base PCB, wherein the one or more formations of each keyboard key and corresponding attachment points of the base, and the electrical connector of the keyboard key and corresponding electrical connection points of the base, are configured for disengagement of the keyboard key from the base upon the application of an external force so that the position of attachment of the keyboard key to the base can be changed and the keyboard can be reconfigured, wherein one or more keyboard keys is selectable from a group of keyboard keys of different sizes, the relative arrangement between the electrical connector and one or more formations of one keyboard key size differing from the relative arrangement between the electrical connector and one or more formations of another keyboard key size, wherein, for each keyboard key size, the relative arrangement between an electrical connector and one or more formations of the keyboard key corresponds to the relative arrangement between an electrical connection point and one or more attachment points of the base so that each size of keyboard key is attachable to the base, and wherein one or more electrical connection points and one or more attachment points are relatively arranged for the attachment of one or more keyboard keys to the base in a first orientation and one or more electrical connection points and one or more attachment points are relatively arranged for the attachment of one or more keyboard keys to the base in a second orientation substantially perpendicular to the first orientation.

2. A reconfigurable keyboard as claimed in claim 1, wherein one or more attachment points and one or more electrical connection points are grouped to form a keyboard key attachment zone for the attachment of a keyboard key to the base.

3. A reconfigurable keyboard as claimed in claim 2, comprising multiple keyboard key attachment zones.

4. A reconfigurable keyboard as claimed in claim 3, wherein the multiple keyboard key attachment zones are relatively arranged for the attachment of a keyboard key to the base via at least two of the multiple keyboard key attachment zones.

5. A reconfigurable keyboard as claimed in claim 4, wherein there are at least three keyboard key attachment zones relatively arranged for the attachment of a keyboard key to the base via two of the at least three attachment zones in a first orientation and to the base via another two of the at least three attachment zones in a second orientation which is different from the first orientation.

6. A reconfigurable keyboard as claimed in claim 1, wherein each of the one or more electrical connection points and each of the one or more electrical connectors are correspondingly shaped such that an electrical connector of a keyboard key may only interface with an electrical connection point of the base when the keyboard key is in a specific orientation relative to the base.

7. A reconfigurable keyboard as claimed in claim 1, wherein one or more electrical connection points have a first shape and one or more electrical connection points have a second shape which is different from the first shape, and wherein one or more electrical connectors of a first keyboard key size are shaped and configured to only fit the first shape of electrical connection points.

8. A reconfigurable keyboard as claimed in claim 1, wherein the base PCB is programmed to transmit a keyboard command to a connected computing device in response to actuation of an attached keyboard key, wherein each electrical connection point for a keyboard key is associated with a specific keyboard command, and wherein the base PCB is programmable to change the keyboard command associated with a particular electrical connection point.

9. A method of assembling a reconfigurable keyboard as claimed in claim 1, comprising the steps of providing a base and one or more keyboard keys and attaching one or more of the keyboard keys to the base each via an electrical connection point and one or more attachment points of the base.

10. The method of claim 9, further comprising the steps of detaching one or more keyboard keys from the base and reattaching one or more keyboard keys to the base in a different configuration.

\* \* \* \* \*